United States Patent
Hensel et al.

(10) Patent No.: US 11,849,878 B2
(45) Date of Patent: Dec. 26, 2023

(54) BREWING UNIT FOR A COFFEE MACHINE

(71) Applicant: Melitta Professional Coffee Solutions GmbH & Co. KG, Minden (DE)

(72) Inventors: Armin Hensel, Rahden (DE); Dirk Meyer, Porta Westfalica (DE); Bernd Buchholz, Rahden (DE)

(73) Assignee: MELITTA PROFESSIONAL COFFEE SOLUTIONS GMBH & CO. KG, Minden (DE)

( * ) Notice: Subject to any disclaimer, the term of this patent is extended or adjusted under 35 U.S.C. 154(b) by 127 days.

(21) Appl. No.: 17/617,110

(22) PCT Filed: Jul. 8, 2020

(86) PCT No.: PCT/EP2020/069207
§ 371 (c)(1),
(2) Date: Dec. 7, 2021

(87) PCT Pub. No.: WO2021/008957
PCT Pub. Date: Jan. 21, 2021

(65) Prior Publication Data
US 2022/0225814 A1    Jul. 21, 2022

(30) Foreign Application Priority Data
Jul. 15, 2019    (DE) .............. 10 2019 119 103.3

(51) Int. Cl.
*A47J 31/36*    (2006.01)
(52) U.S. Cl.
CPC ....... *A47J 31/3614* (2013.01); *A47J 31/3619* (2013.01)

(58) Field of Classification Search
CPC .............. A47J 31/3614; A47J 31/3619
USPC ............................... 99/289 R, 289 D
See application file for complete search history.

(56) References Cited

U.S. PATENT DOCUMENTS

| 5,255,594 | A | 10/1993 | Grossi |
| 7,066,079 | B2 | 6/2006 | Sager |
| 10,537,203 | B2 | 1/2020 | Van Boxtel et al. |
| 2015/0289705 | A1* | 10/2015 | Van Boxtel ............. A47J 31/36 99/289 R |
| 2016/0157663 | A1* | 6/2016 | Radhakrishnan ... A47J 31/3614 99/283 |

FOREIGN PATENT DOCUMENTS

| CN | 107307744 A | 11/2017 |
| DE | 9115998 U1 | 4/1993 |

(Continued)

OTHER PUBLICATIONS

English translation and original publication EP 2764802 A1, Eder et al., Fully Automatic Coffee Machine With Swiveling Brewing Chamber And Scraper Blade (Year: 2014).*

(Continued)

*Primary Examiner* — Dana Ross
*Assistant Examiner* — James F Sims, III
(74) *Attorney, Agent, or Firm* — Collard & Roe, P.C.

(57) ABSTRACT

A brewing unit for a piston coffee machine is designed as a spindle brewing unit with an outer spindle and inner spindle, and with a brewing slide as a brewing chamber, two piston units in the form of a showerhead and a plunger, a drive motor, and at least one gearing mechanism.

17 Claims, 20 Drawing Sheets

(56) References Cited

FOREIGN PATENT DOCUMENTS

| | | |
|---|---|---|
| DE | 102004023964 B3 | 1/2006 |
| DE | 102005049625 A1 | 5/2007 |
| DE | 202009000075 U1 | 6/2010 |
| DE | 102013214578 A1 | 1/2015 |
| EP | 0450200 A1 | 10/1991 |
| EP | 0521561 A1 | 1/1993 |
| EP | 2907427 A1 | 8/2015 |
| WO | 2009021395 A1 | 2/2009 |
| WO | 2014077687 A1 | 5/2014 |

OTHER PUBLICATIONS

International Search report dated Oct. 26, 2020 issued in PCT/EP2020/069207 (with English Translation).
German Search Report dated Mar. 6, 2020 issued in the corresponding German Application Serial No. 10 2019 119 103.3 (with English translation of relevant parts).

* cited by examiner

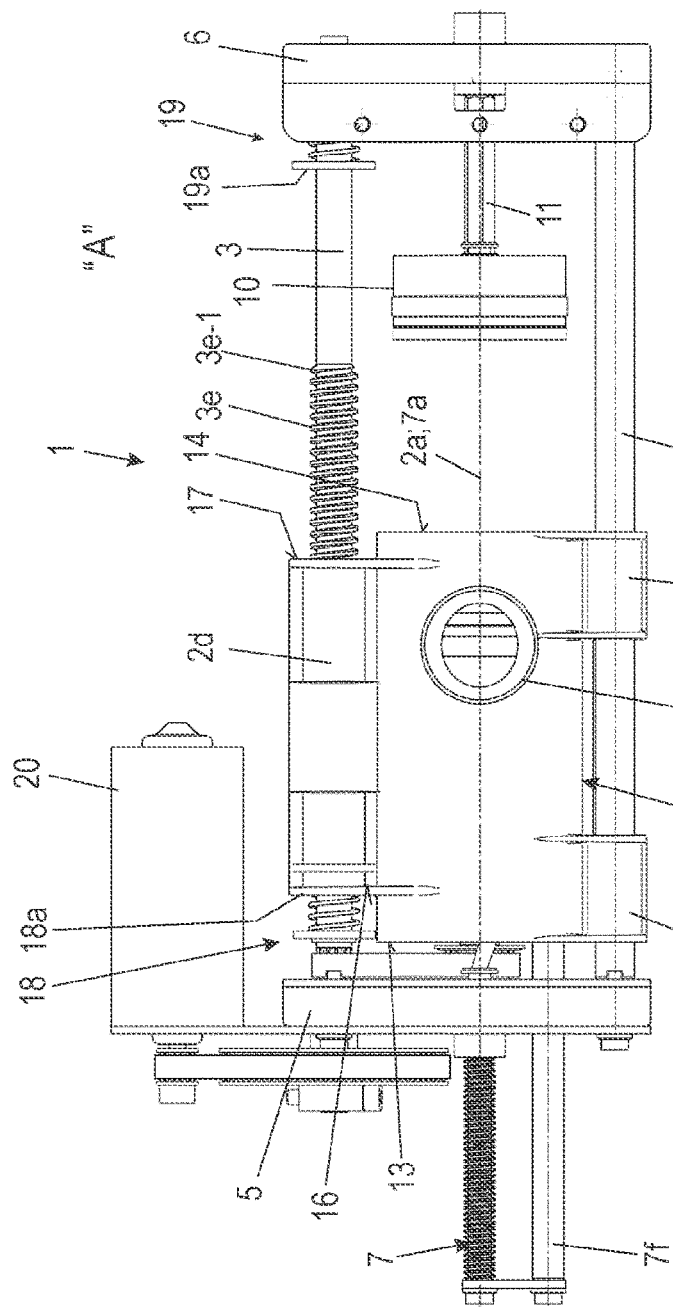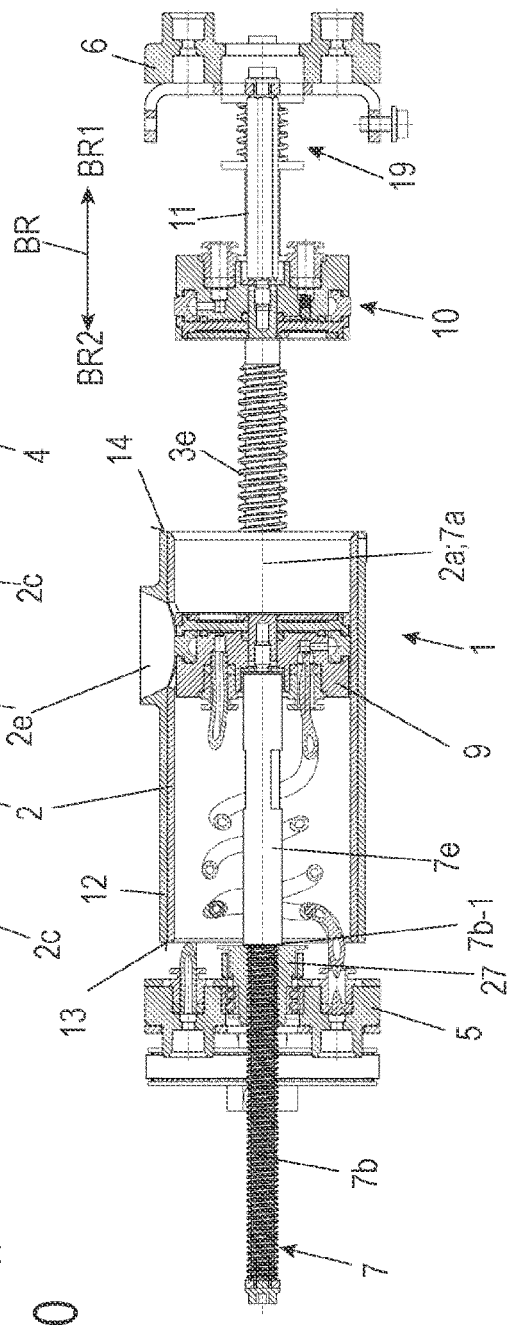
Fig. 9
Fig. 10

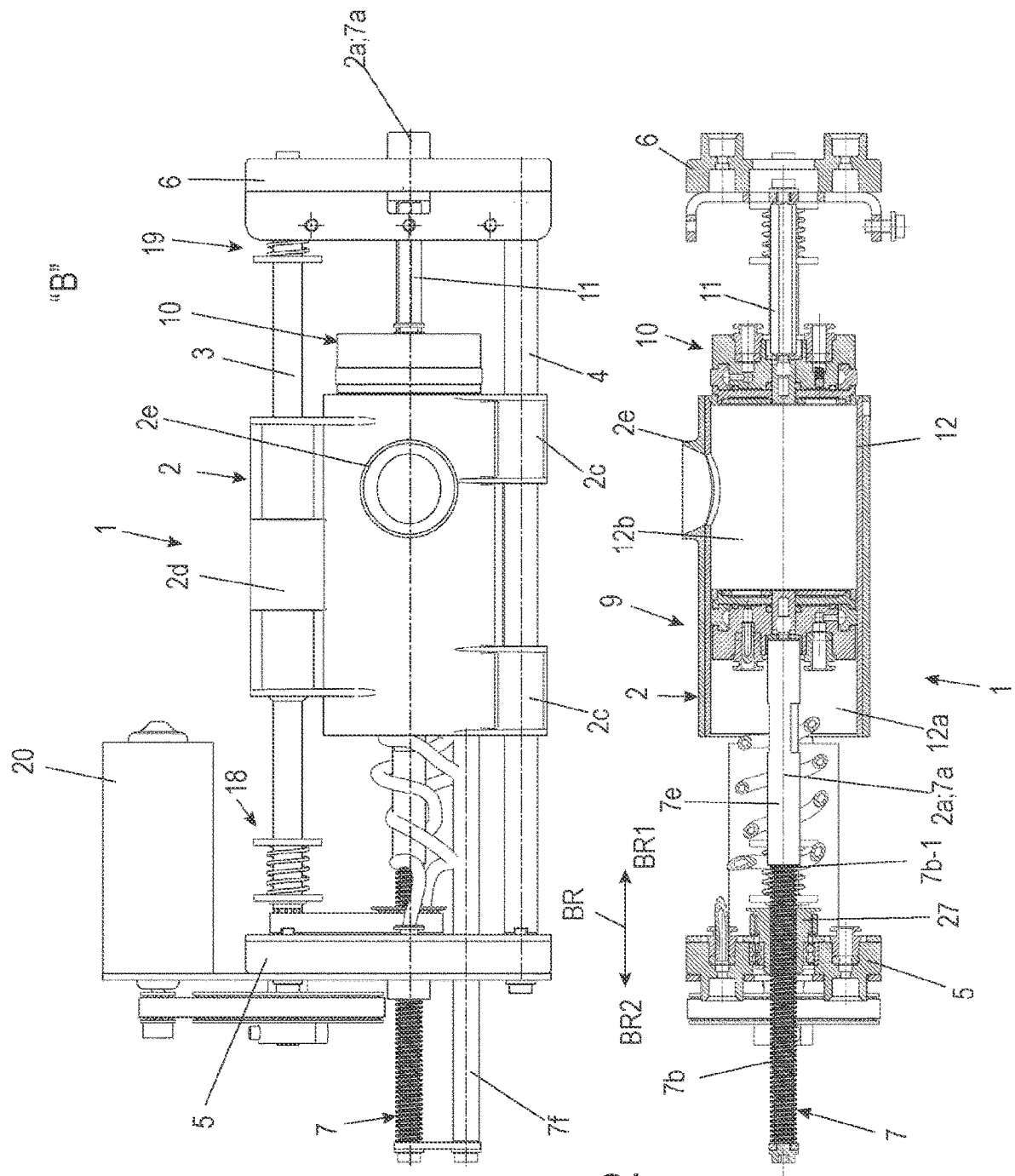

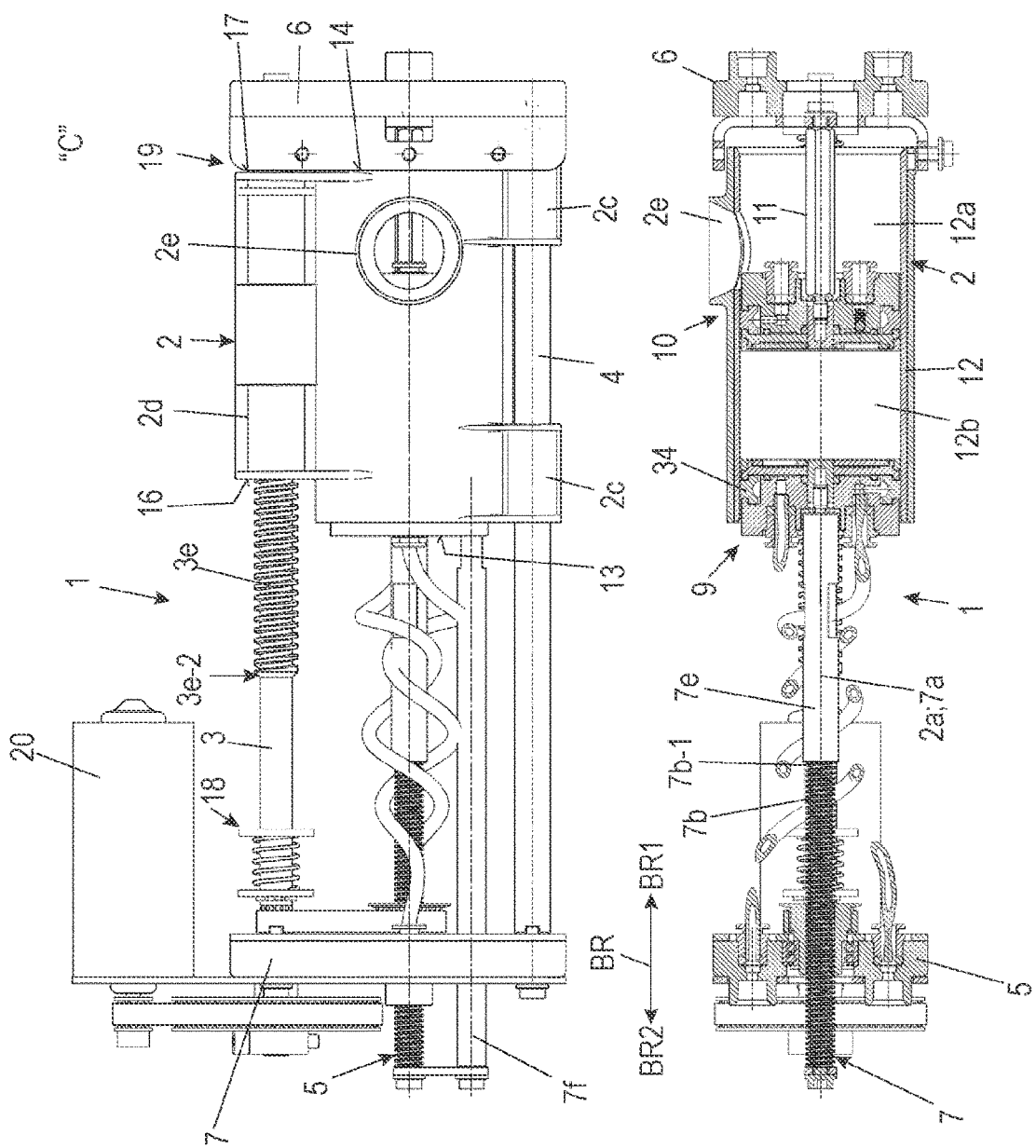

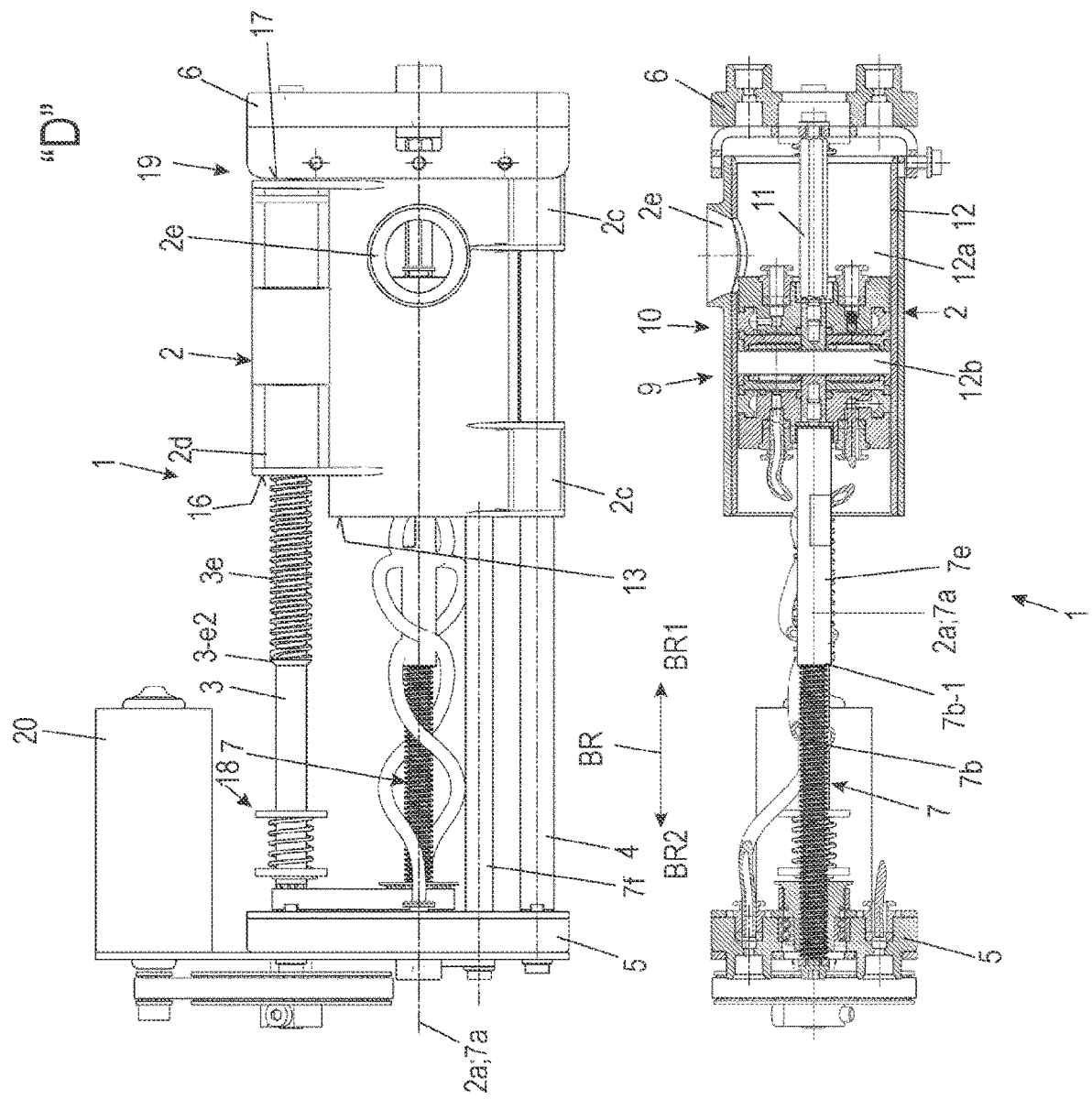

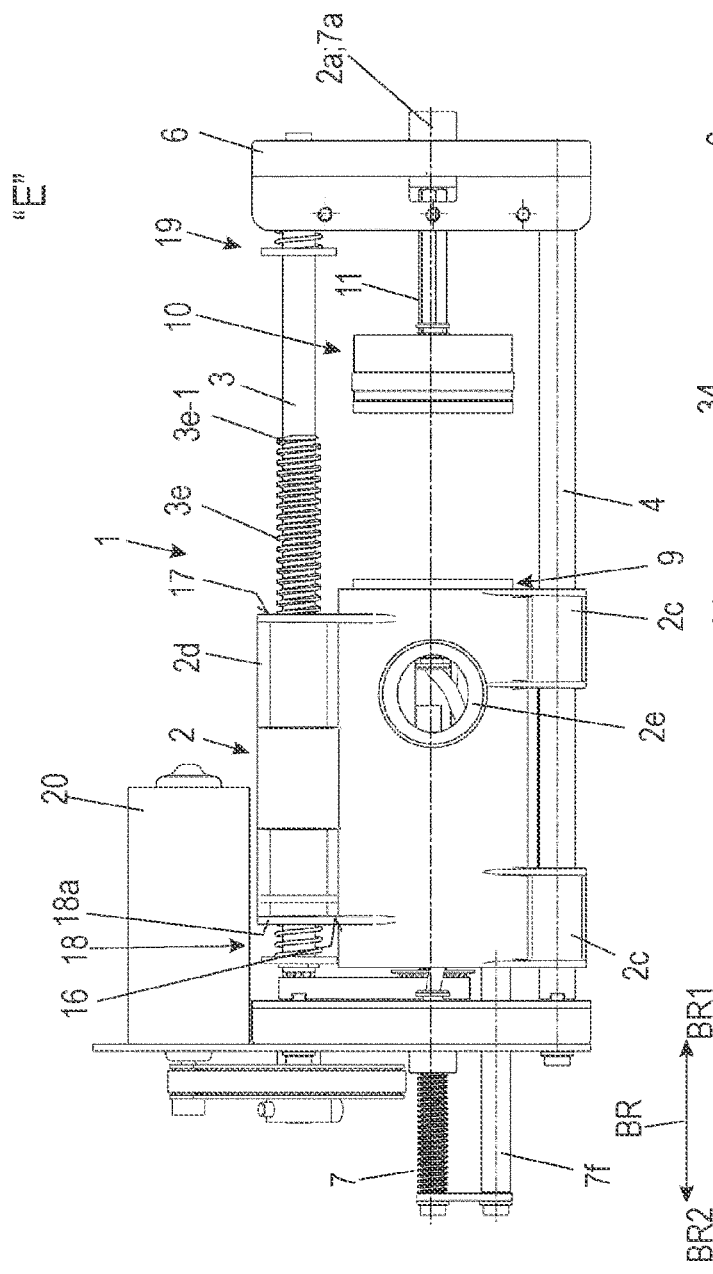
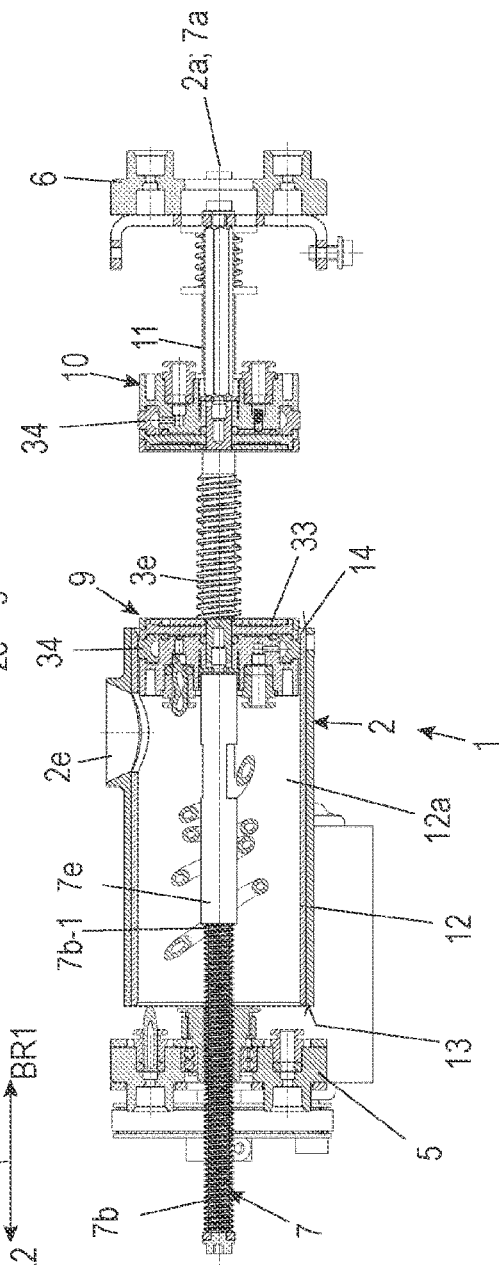
Fig. 17
Fig. 18

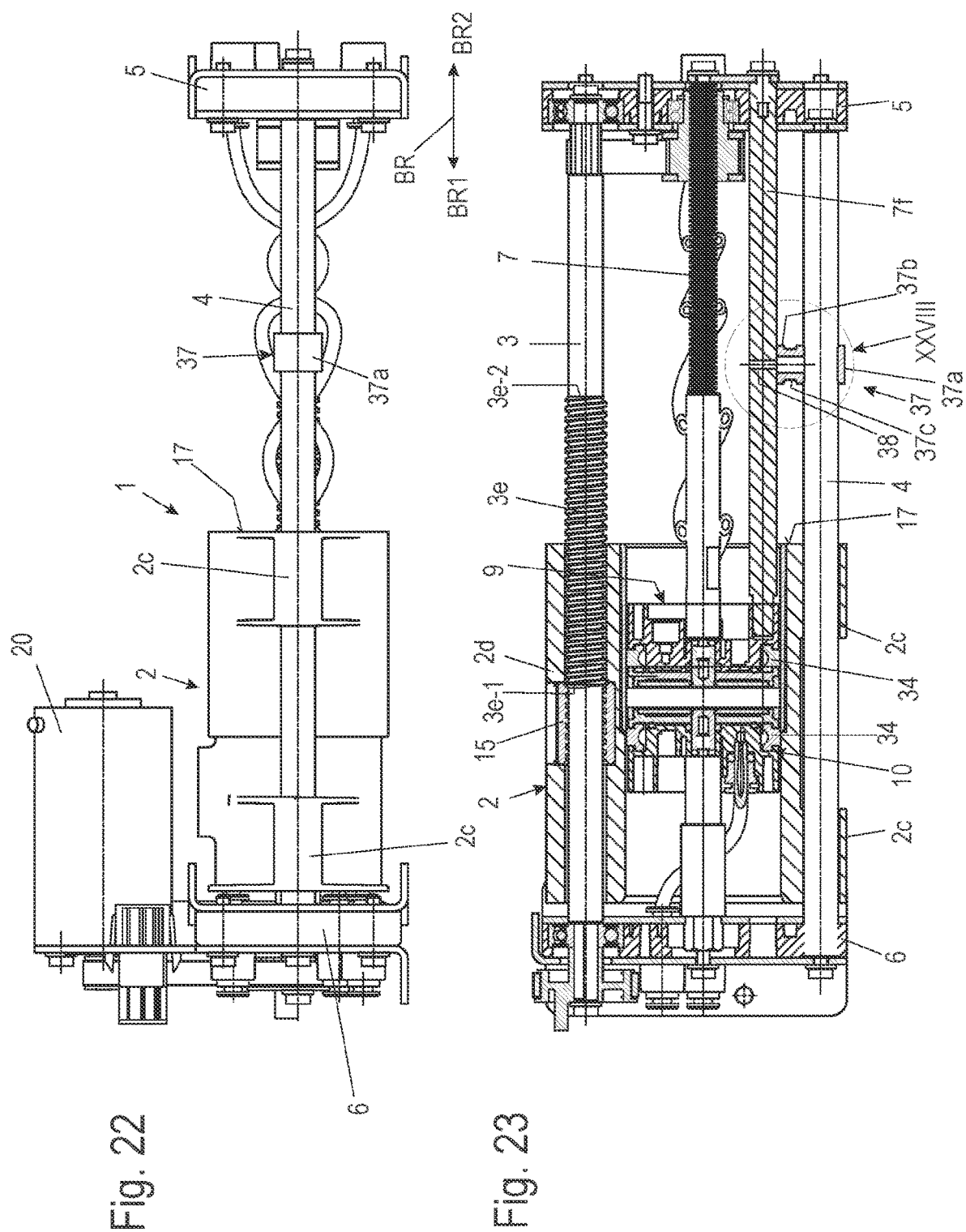

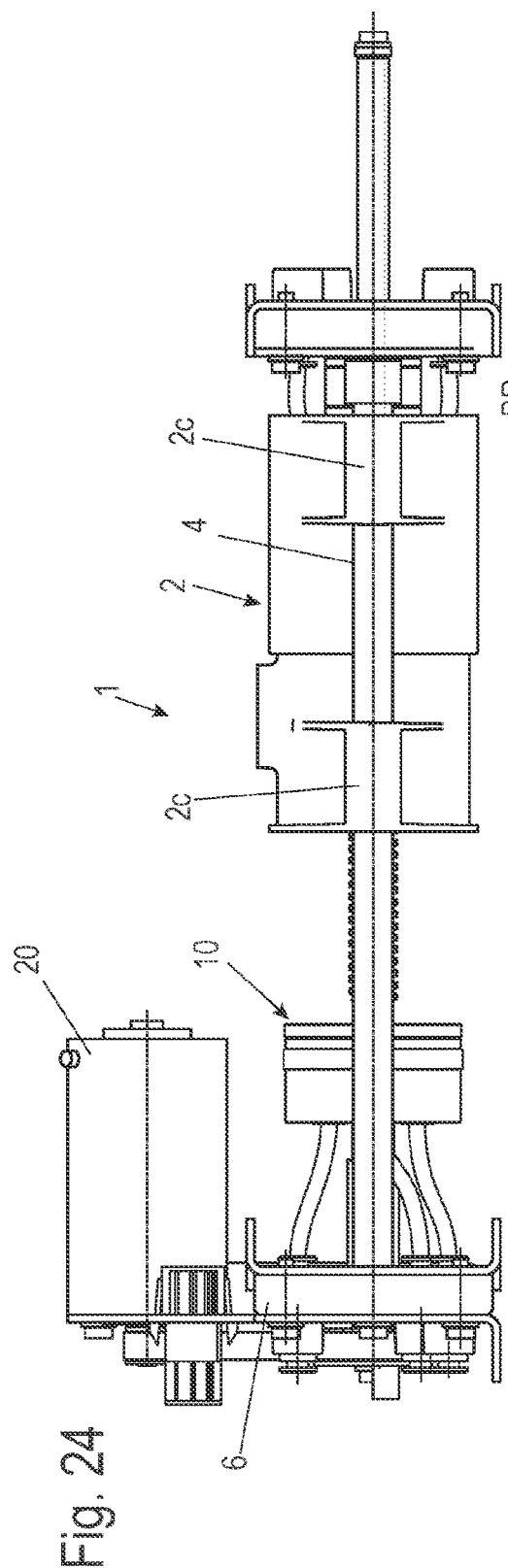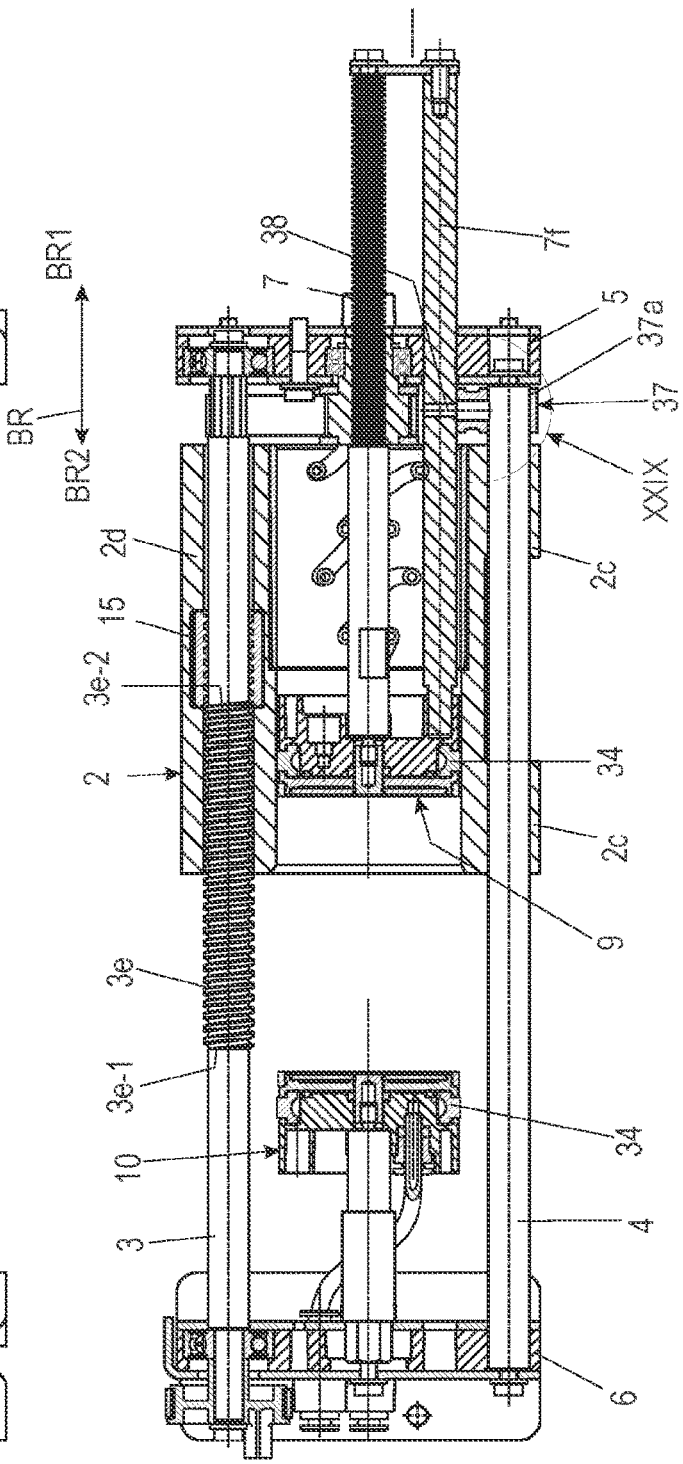

BREWING UNIT FOR A COFFEE MACHINE

CROSS REFERENCE TO RELATED APPLICATIONS

This application is the National Stage of PCT/EP2020/069207 filed on Jul. 8, 2020, which claims priority under 35 U.S.C. § 119 of German Application No. 10 2019 119 103.3 filed on Jul. 15, 2019, the disclosures of which are incorporated by reference. The international application under PCT article 21(2) was not published in English.

BACKGROUND OF THE INVENTION

The invention relates to a brewing unit of a piston coffee machine according to the preamble of claim 1, and to a piston coffee machine comprising such a brewing unit.

Brewing units of piston coffee machines are known in many embodiments. Inside the brewing unit of a piston coffee machine, coffee powder is ground into a brewing chamber and then pressed into a coffee cake. Water heated under positive pressure is then passed through the cake to extract flavors from the powder. After a product-specific amount of water has flowed through, the moistened coffee powder is pressed out and the coffee cake (coffee grounds) is discharged into the grounds container.

A typical brewing chamber of a brewing unit is circular and has a diameter of, for example, about 45 mm. The hot water is introduced into the brewing chamber on one side through a piston unit called a shower screen, atomizing it as evenly as possible to wet all parts of the coffee cake with water. On the other side, the extracted coffee is dispensed by a plunger forming another piston unit. In this process, the extracted coffee is often passed through a spring-loaded oscillating component (crema valve) that allows only a small opening gap to create the typical crema on the coffee.

To prevent very fine particles from being discharged into a coffee cup, there is often a fine screen on the plunger.

A drive motor causes a relative movement between the plunger and the shower screen so that the distance between them can be changed. Defined pressing forces can then be set via different motor torques.

At the same time, a movement of the brewing chamber must also take place in order to realize the insertion position for the coffee powder, to create a sealed brewing chamber space and finally to be able to eject the pressed-out coffee cake. In horizontal brewing units, the ejection is often performed by the gravity principle. In vertical units, there is usually an additional movement mechanism to eject the cake specifically into the grounds container via a pusher.

The coffee cake height can be used to indirectly infer the weight and this can then be specifically adjusted to a nominal weight, for example, in order to correct variable grinding capacities of the grinder. The plunger or shower screen position during powder pressing is recorded in a simple manner via the motor increments.

Basically, a distinction is made between two installation types of brewing units. Horizontal (lying) and vertical (standing) units. The horizontal variant has the advantage that the coffee machine can be designed very compactly and that the coffee grounds are often only discharged into the grounds container by gravity.

Upright brewing units usually require an additional pusher mechanism for coffee grounds ejection. However, they also have the option of processing larger weights and the coffee powder can be compacted more evenly.

There are different drive concepts to approach the necessary relative positions of plunger, shower screen and brewing chamber.

Initially, the two asynchronous motion sequences can be implemented via two different drive motors. One motor is then responsible for moving the brewing chamber and another for pressing the coffee powder. The disadvantage of this simple solution is that two drives are often very cost-intensive. Additional motors are often also used for a pusher movement to eject the coffee grounds into a grounds drawer. Here, movement threads such as trapezoidal spindles by means of sliding blocks enable the rotary movement of the drive to be converted into a linear piston movement in many designs.

If only one motor is available, the relative positions are generated, for example, via control grooves (e.g. in a control roller). In this case, several components (plunger slide, brewing bush) are simultaneously guided in grooves via a rotary movement. The disadvantages here are complex and non-compact designs, as well as high bending moments due to off-center guides.

The toggle lever principle is frequently encountered in the household sector in particular. An elaborate kinematic approach is used to generate a functional linear movement via several joints. The disadvantage is usually that the piston elements can be moved quickly, but the coffee powder is compressed with the same force regardless of the product. Defined and variable forces with larger dimensions cannot be represented.

Generally, in favorable configurations of brewing units, a compromise is accepted between fast movement of the piston function elements and a defined, adjustable pressing of the coffee powder.

The document EP 2 907 427 B1 describes a non-linear gear section by which a compromise between high pressing forces and simultaneously short travel cycles is achieved. To move to the various positions, the functional elements are moved with large gradients. When compacting the coffee powder, the drive motor is reduced with a significantly smaller pitch in order to transmit large forces with the same guide.

These embodiments have proven themselves, but in the course of cost savings in components, functional groups, assembly times and maintenance, there is a constant need for improvements.

SUMMARY OF THE INVENTION

The invention therefore has the object of advantageously further developing a brewing unit of a piston coffee machine, in order to provide an improved brewing unit and an improved piston coffee machine.

The invention solves this problem by means of a brewing unit having the feature of claim 1 and by means of a piston coffee machine having the feature of claim 28.

One idea of the invention is that all ratios are constant in the double-spindle principle, i.e. the spindles and gearing mechanisms have constant pitches or ratios. A standstill of the brewing slide is realized by a spindling out of the brewing slide, so that in this case there is no transmission.

A brewing unit of a piston coffee machine according to the invention, wherein the brewing unit is designed as a spindle brewing unit having a brewing slide as a brewing chamber, two piston units in form of a shower screen and plunger, a drive motor and at least one gearing mechanism, characterized in that the brewing unit comprises a double-spindle assembly having an outer spindle and an inner spindle.

A particular advantage here is a very compact and lightweight design, which enables a simple and therefore cost-effective assembly.

In a preferred embodiment, the outer spindle has a movement thread which is in engagement with an outer spindle nut axially fixed in the brewing slide. In this way, it is advantageous to use high-quality components that are available on the market at low cost.

It is provided that in the preferred embodiment the brewing slide is adjustable from a first end position to an intermediate position, then to a second end position and back to the first end position. Thus, defined positions of the brewing slide are advantageously simply enabled.

A particular advantage arises in the preferred embodiment when the movement thread of the outer spindle is out of engagement with the outer spindle nut in the first end position and in the second end position of the brewing slide, and a speed of the brewing slide is zero even if the outer spindle continues to rotate. Thus, a rest position of the brewing slide at a stop in the respective end position can be made possible in a simple manner, wherein nevertheless the outer spindle driven by the drive motor continues to drive the inner spindle via the gearing mechanism in order to position the inner spindle and thus the shower screen. A further motor is not required.

In one embodiment, the outer spindle is connected to the adjustable brewing slide, the inner spindle is connected to the adjustable shower screen, and the plunger is arranged in a stationary manner. The outer spindle and inner spindle are simple to manufacture components with a high-quality level at low prices.

It is provided in this case that the adjustable brewing slide is guided longitudinally displaceably by means of the outer spindle and a guide rod, and that the shower screen is guided longitudinally displaceably within the brewing slide, wherein the brewing slide and the shower screen are adjustable at different speeds in common directions of movement. Hereby, an advantage results in a simple and inexpensive structure in which very high speeds can be realized.

An advantageous centric force application and thus high rigidity of the brewing group is made possible by the fact that the outer spindle is driven by the drive motor and is coupled to the inner spindle via the at least one gearing mechanism. Further additional motors are not required.

It is advantageous if the brewing unit has at least one switchable electromagnet which fixes the brewing slide in the respective end position in a releasable manner again directly or indirectly via a mechanical locking device, since in this way it is possible to avoid overriding noises from the movement thread and outer spindle nut when the brewing slide is "at a standstill".

In the end positions of the brewing slide, the outer spindle movement thread disengages from the outer spindle nut of the brewing slide. This is called "spinning out". In order for the brewing slide to be moved back out of these end positions, the outer spindle nut of the brewing slide must be re-engaged with the movement thread of the outer spindle. This process is referred to as "spindle re-engagement".

In one embodiment, the brewing unit comprises at least one spindle re-engagement device which causes re-engagement of the outer spindle nut and the movement thread in the first end position or the second end position. An advantage of this is that re-engagement of the outer spindle nut and the movement thread is made possible in a simple manner with only a small number of components.

In this regard, one embodiment provides that the at least one re-engagement device comprises at least one stop unit with a respective compression spring. These are simple and inexpensive components.

In this regard, it is advantageous if the brewing slide pretensions a compression spring of a first stop unit in the first end position, and that the brewing slide pretensions a compression spring of a second stop unit in the second end position in order to thus "load" a force storage element.

Furthermore, it is provided in one embodiment that the compression spring of the first stop unit re-engages the movement thread of the outer spindle with the outer spindle nut of the brewing slide when the brewing slide is moved from the first end position by means of the outer spindle, and that the compression spring of the second stop unit re-engages the movement thread of the outer spindle with the outer spindle nut of the brewing slide when the brewing slide is moved from the second end position by means of the outer spindle.

In an alternative embodiment, the at least one spindle re-engagement device comprises at least one switchable electromagnet which exerts a movement pulse on the brewing slide in the respective end position, directly or indirectly via a mechanical device, which causes renewed engagement of the outer spindle nut and movement thread in the first end position or the second end position. This results in a simple structure with a very small number of additional components.

The at least one spindle re-engagement device may also comprise at least one switchable electromagnet with a movable core. The movable core can exert a movement pulse on the brewing slide in an advantageously simple manner.

In another alternative embodiment, the at least one spindle re-engagement device comprises at least two switchable and reversible electromagnets, one of which is fixed and the other of which is attached to the brewing slide. This is advantageous as no moving parts are required and the electromagnets are not only easily controlled, but are also commercially available low-cost components of high quality.

Friction elements can also be attached to the movable inner spindle for spindle re-engagement, in particular to the shower screen (or to the plunger). The friction force between the shower screen and the brewing chamber presses the outer spindle nut of the brewing slide back into the associated outer thread of the outer spindle as soon as a reversal of movement occurs on the inner spindle.

To this end, it is provided in one embodiment that the at least one spindle re-engagement device comprises at least one friction element directly on the movable inner spindle or indirectly on a component attached to the inner spindle in cooperation with the brewing slide.

Hydraulic sealing elements on the plunger/shower screen can also be used specifically for this function. Due to a time-delayed relief of the seals after reversal of the direction of the inner spindle, a high frictional force is transmitted to the brewing slide and this is briefly synchronized with the inner spindle movement. This results in an advantageous movement impulse on the brewing slide, which results in spindle re-engagement. Another advantage is that the increased friction is no longer present in the remaining course of movement after the seal has been relieved. This avoids additional wear of the moving components.

For this purpose, in a further embodiment, the at least one spindle re-engagement device comprises at least one friction element configured as at least one hydraulic sealing element.

It is thereby advantageous if the at least one hydraulic sealing element is a seal attached to the shower screen or to the plunger, which is controlled by the application of a pressure. Advantageous control is enabled if the at least one hydraulic sealing element is controlled by a solenoid valve. In this way, in the case of two or more such seals, separate independent control of the hydraulic sealing elements can be made possible.

On the side of the movable inner spindle, a friction element on the entrained anti-rotation device is also conceivable. This gives the brewing slide the necessary impulse for spindle re-engagement device and can be moved in the other positions of the brewing slide without blocking the brewing unit.

For this purpose, in another embodiment, the at least one spindle re-engagement device comprises a driver device having at least one driver which is displaceably guided on the one hand on the inner spindle or a component connected to the inner spindle and on the other hand on the guide rod, wherein the driver is held in a rest position with respect to the inner spindle or the component connected to the inner spindle with a specific holding force which is greater in the rest position than outside the rest position. An advantage here is a small space requirement.

In a still further embodiment, the at least one driver comprises a first retaining element, wherein a second retaining element is attached to or in the inner spindle or to or in the component connected to the inner spindle, wherein the first retaining element and the second retaining element generate the determined retaining force in the rest position of the driver. Thus, an advantageously simple structure can be provided.

In a still further embodiment, the first retaining element and the second retaining element are each a permanent magnet. These are simple and inexpensive high-quality components.

Alternatively, the first retaining element may be a spring-loaded ball thrust element which, in the rest position of the driver, is in contact with a corresponding indentation or groove in the inner spindle or in the component connected to the inner spindle.

In order to avoid friction and the thus possibly resulting increased proportion of wear parts, it is advantageous to replace the friction element via the magnetically effective or spring-loaded driver. In the anti-rotation device, which is moved in parallel by the inner spindle and is designed as a securing rod, there is a further permanent magnet which is poled in such a way that it causes an attractive force on the driver or has a groove for the ball pressure element.

The joining force of this connection is large enough for the impulse for spindle re-engagement of the brewing bush but small enough so that jamming of the brewing unit is avoided.

It is provided in a still further embodiment that the inner spindle has a movement thread which engages with a stationary rotatably mounted inner spindle nut. In this way, a rotation transmitted from the outer spindle through the gear to the inner spindle nut can advantageously cause a longitudinal adjustment of the inner spindle and thus of the shower screen connected thereto.

For a particularly advantageous reduction in installation space, the inner spindle nut can be a component of an output gear of the at least one gearing mechanism.

In a still further embodiment, the inner spindle is connected to a securing rod as an anti-rotation device. The securing rod provides an additional advantageous guide stabilization of the shower screen.

It is also advantageous for a compact structure if the securing rod, the outer spindle, the inner spindle and the guide rod are arranged parallel to each other.

If the drive motor is coupled to the outer spindle via a gearing mechanism, different types of drive motors can advantageously be used by adapting this gearing mechanism.

A piston coffee machine according to the invention comprises the brewing unit described above.

For further advantageous designs are disclosed in the remaining subclaims.

The advantages over conventional brewing unit designs for coffee machines are highlighted below:
Very compact and lightweight design
Simple and therefore cost-effective assembly
Very high speeds can be achieved
Centric force application and thus high rigidity of the brewing group
Defined coffee grounds discharge
Integrated transmission stage through the belt drive between the spindles
Only one drive motor necessary
A large number of transmission ratios are constructively possible by suitable selection of the spindle pitches and the belt transmission→flexible adaptation of the brewing unit to selected drive motors
With a comparatively low-power drive, both high travel speeds and contact forces that can be adjusted over a wide span can be achieved.
Grinding position in the grounds container
Identical parts for plunger and shower screen assemblies and base plates
Self-locking of the inner spindle during the brewing process and thus no counter-holding of the drive motor required
Crema product-specific selectable (optional brewing line without crema valve)
Hydraulic inlets and outlets are integrated in the piston unit (spindle-guided FEP pipes)

In the following, the invention will be described in more detail with reference to the drawings by way of an exemplary embodiment and a variant. The figures serve only to explain the invention in more detail and are not restrictive of the invention. Individual features described may also be applied in their own right to further embodiment variants within the scope of the general skill in the art, wherein:

BRIEF DESCRIPTION OF THE DRAWING FIGURES

FIG. 1: shows a schematic perspective view of an exemplary embodiment of a brewing unit of a coffee machine according to the invention;

FIGS. 2-3: show various schematic views of the exemplary embodiment according to FIG. 1, FIG. 4: shows a schematic sectional view according to line IV-IV from FIG. 3;

FIG. 5: shows a schematic sectional view along line V-V from FIG. 3;

FIG. 6: shows a schematic sectional view along line VI-VI from FIG. 2;

FIGS. 7-8: show schematic sectional views according to FIG. 5 in various end positions of the brewing unit according to the invention;

FIGS. 9-18 show schematic views of the brewing unit according to the invention in various positions;

FIGS. 22-27 show schematic views of the variation according to FIGS. 19-20 in various positions.

DETAILED DESCRIPTION OF THE INVENTION

Figure 1:
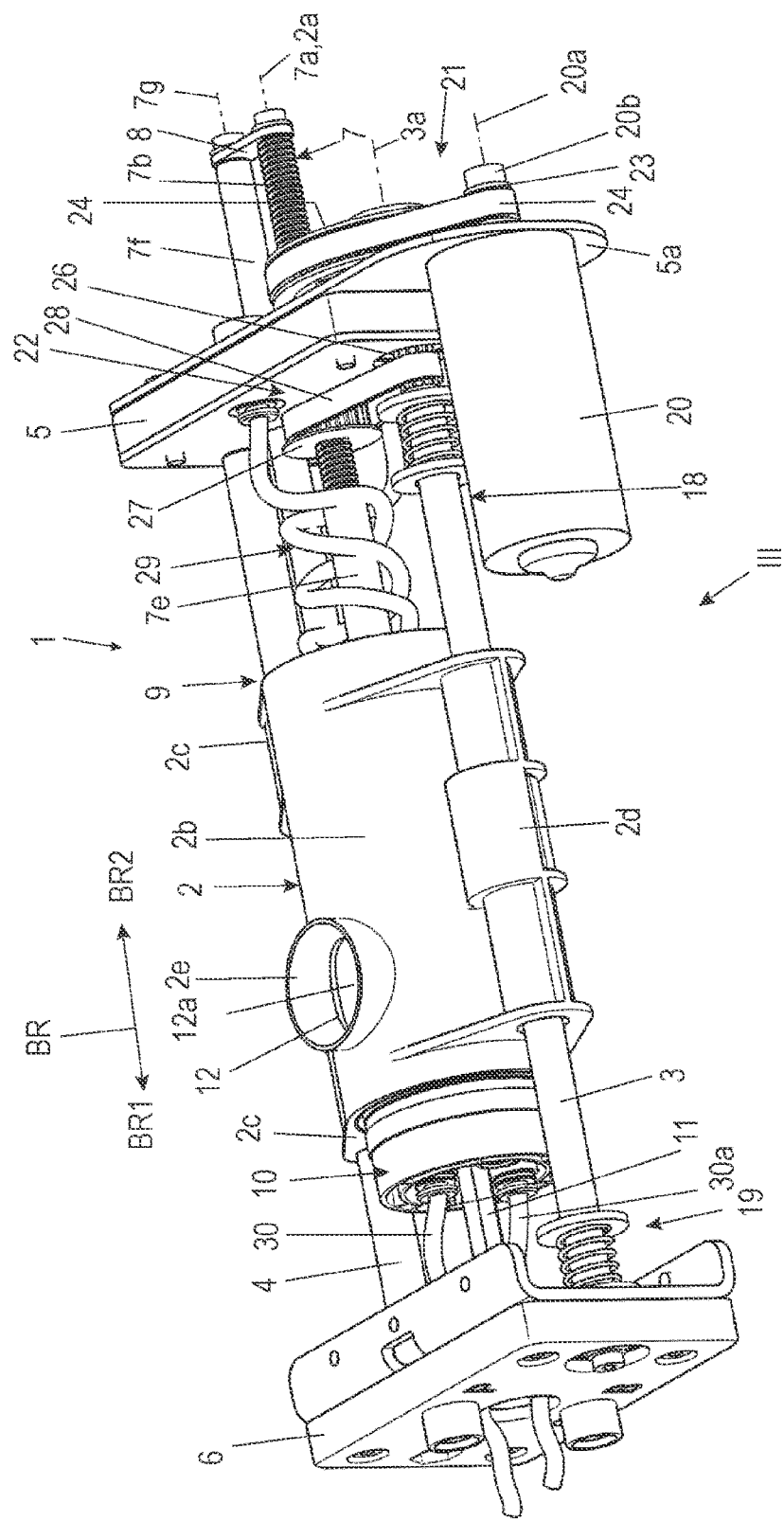
Figure 2:
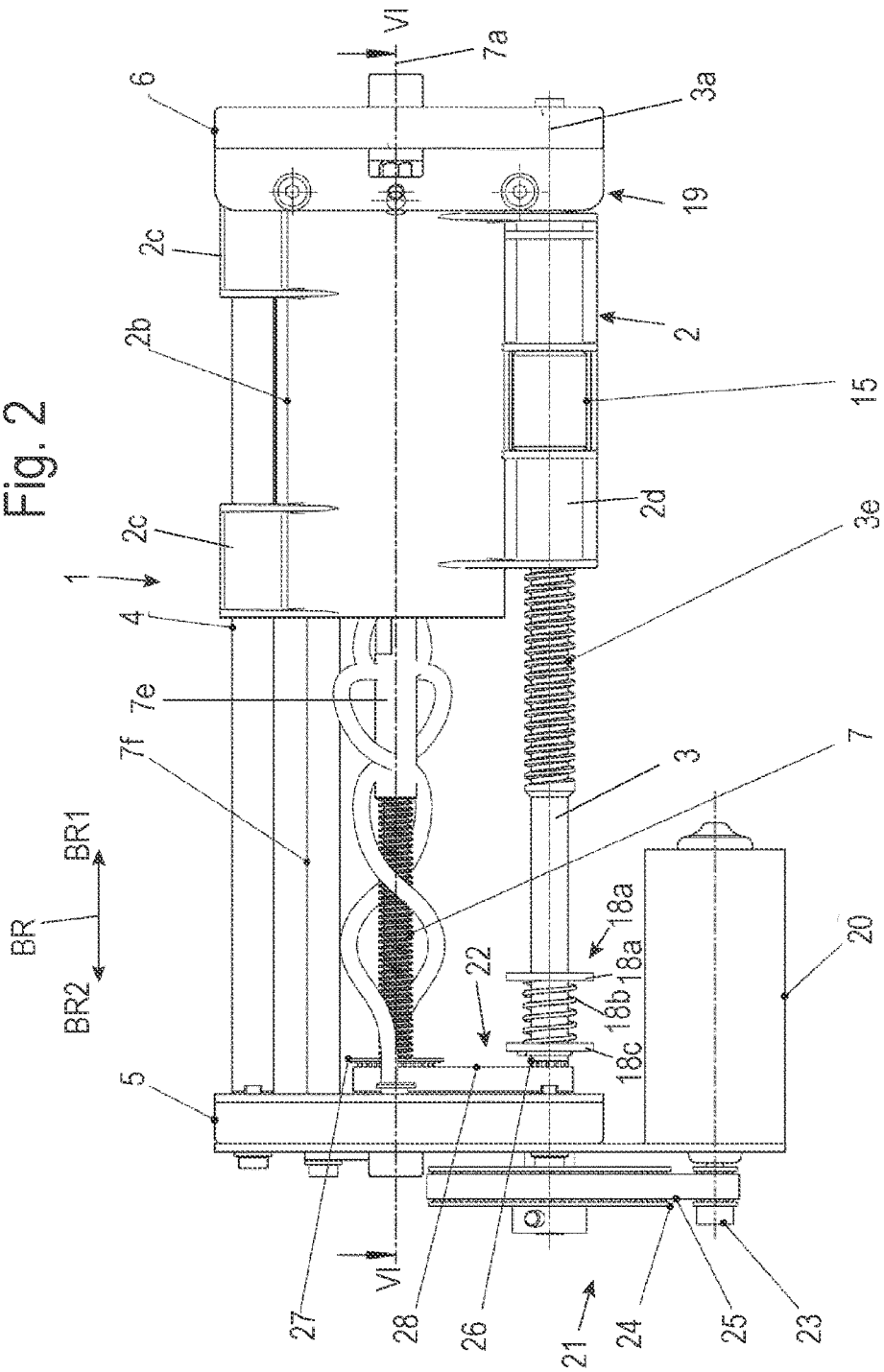
Figure 3:
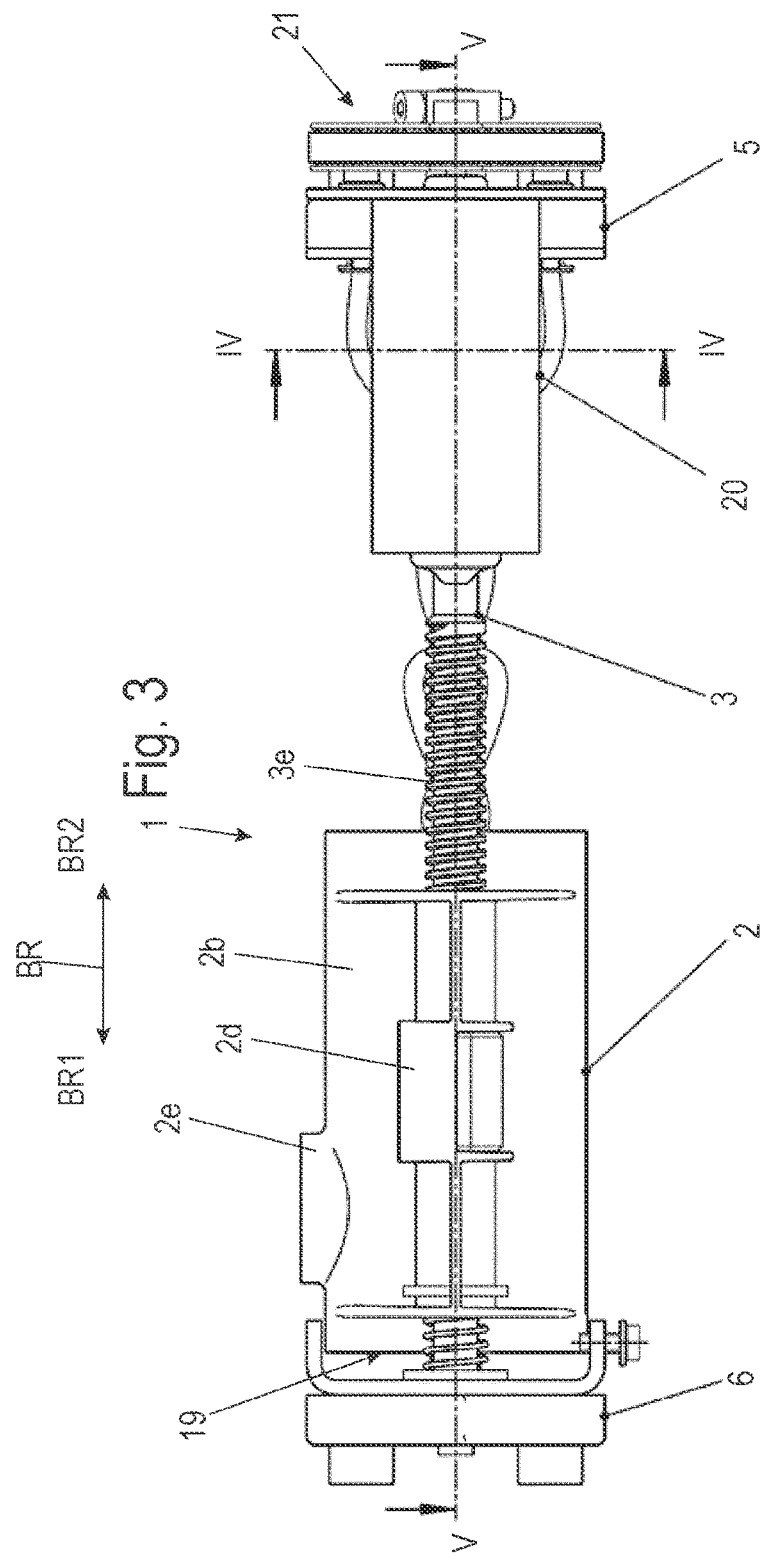
Figure 4:
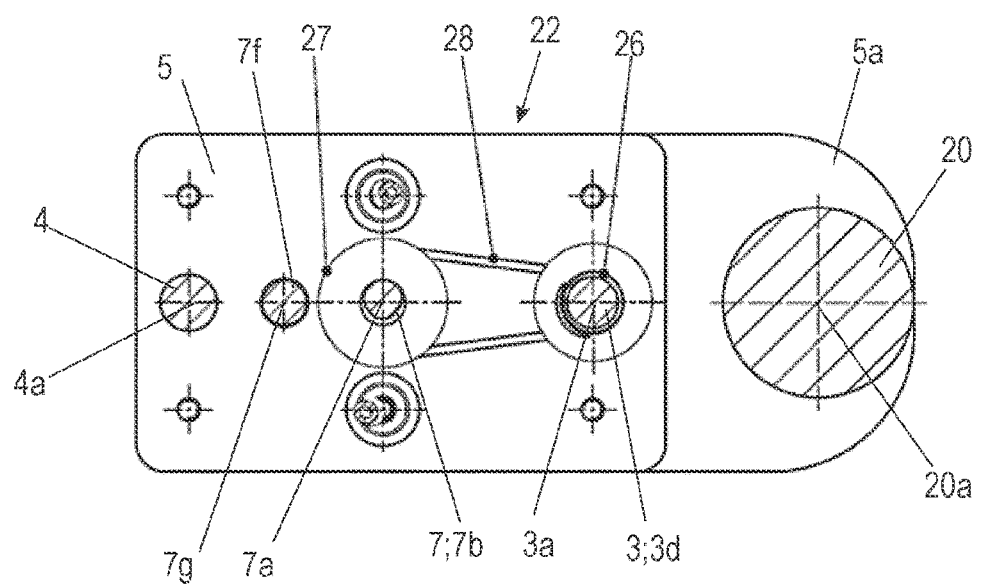
Figure 5:
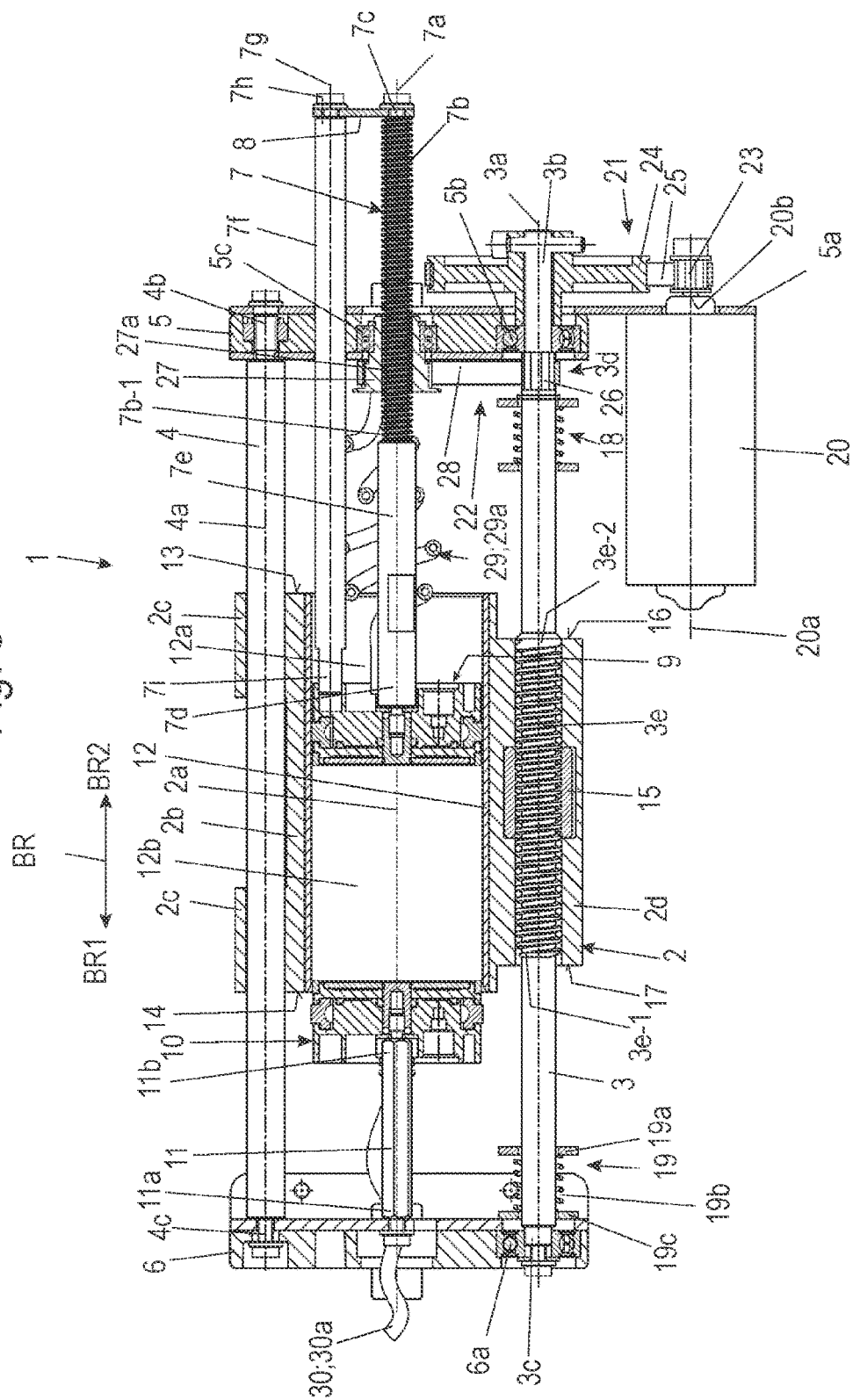

FIG. 1 shows a schematic perspective view of an exemplary embodiment of a brewing unit 1 of a piston coffee machine according to the invention. FIG. 2 shows a schematic top view of the underside of the brewing unit 1 according to FIG. 1. A schematic side view of the brewing unit 1 in viewing direction III in FIG. 1 is shown in FIG. 3. FIG. 4 shows a schematic sectional view according to line IV-IV of FIG. 3. FIG. 5 shows a schematic sectional view according to line V-V of FIG. 3.

The exemplary embodiment shown here is a horizontal brewing unit 1. The embodiment can also be transferred to a vertical brewing unit 1 or one with any other angle of inclination. The brewing unit 1 is a spindle brewing unit.

In this case, the brewing unit 1 comprises a brewing slide 2, also referred to as a brewing chamber, an outer spindle 3, a guide rod 4, a first base plate 5 and a second base plate 6, an inner spindle 7, two piston units, namely a so-called shower screen 9 and a plunger 10, and a drive motor 20.

The system offers the possibility of realizing the required relative positions between the plunger 10, the shower screen 9 and the brewing slide 3 of the brewing unit 1 for a piston coffee machine not shown, by means of a double-spindle assembly and a drive.

Via the (only one) drive motor 20, a relative movement between plunger 10 and shower screen 9 takes place, so that the distance between them can be changed. Defined pressing forces can then be set via various motor torques. At the same time, a movement of the brewing slide 2 must also take place in order to realize an insertion position for the coffee powder, to create a sealed brewing chamber space and finally to be able to eject the pressed-out coffee cake.

The double-spindle assembly comprises the outer spindle 3 and the inner spindle 7.

The outer spindle 3 adjusts the brewing slide 2, the inner spindle 7 adjusts the shower screen 9, wherein the plunger 10 is fixedly attached to the second base plate 6.

The brewing slide 2 is moved from a first end position to an intermediate position, then to a second end position and back to the first end position. In doing so, the shower screen 9 is moved to different positions with respect to the brewing slide 2 and the plunger 10.

The shower screen 9 is always arranged in the brewing slide 2 and can assume different relative positions with respect to the brewing slide 2. These relative positions are made possible independently of each other by the movements of the shower screen 9 due to the inner spindle 7 and by the movements of the brewing slide 2, which is adjustable by the outer spindle 3.

The plunger 10 can be located outside or inside the brewing slide 2. Since the plunger 10 is arranged in a fixed position here, the relative positions/movements of the brewing slide 2 and the shower screen 9 to the plunger 10 are made possible by the inner spindle 7 (shower screen 9) and the outer spindle 3 (brewing slide 2).

The shower screen 9 (or the plunger 10) and the brewing slide 3 always have a common direction of travel, but they have different speeds (differential speeds) in order to thereby achieve the necessary relative positions between these two components. To facilitate the representation of these directions of travel, a double arrow direction of movement BR is indicated in each figure with two opposite directions of movement BR1 and BR2.

The outer spindle 3 with an outer spindle axis 3*a*, the guide rod 4 with a guide axis 4*a* and the inner spindle 7 with an inner spindle axis 7*a* are arranged parallel to each other. The directions of movement BR1 and BR2 are parallel to these axes 3*a*, 4*a*, 7*a*.

The two base plates 5 and 6 of the brewing unit 1 are here rectangular plates, parallel to each other and arranged at right angles to the axes 3*a*, 4*a*, 7*a*.

Attached to the first base plate 5, shown on the right in FIG. 1, is a retaining plate 5*a* which projects outwardly at right angles from the outer spindle axis 3*a* and forms a mounting for the drive motor 20.

The first base plate 5 comprises a bearing 5*b* for the outer spindle 3 and a bearing 5*c* for the inner spindle 7.

The second base plate 6 has a bearing 6*a* for the outer spindle 3 opposite the bearing 5*b*. In addition, the plunger 10 is attached to the second base plate 6 by means of a rod-shaped plunger holder 11. For this purpose, the plunger holder 11 has a first plunger end 11*a* connected to the base plate 6 and a second plunger end 11*b* connected to the plunger 10. The plunger 10, the plunger holder 11, the shower screen 9, the brewing slide 2 and the inner spindle 7 are arranged coaxially with respect to a brewing slide axis 2*a*.

The outer spindle 3 and the guide rod 4, which is also called the tie rod, connect the two base plates 5, 6 to each other.

The outer spindle 3 has a drive end 3*b*, with which the outer spindle 3 is rotatably mounted in the bearing 5*b* of the first base plate 5. A bearing end 3*c* of the outer spindle 3 is rotatably mounted to the drive end 3*b* in the further bearing 6*a* in the second base plate 6. In this way, the outer spindle 3 connects the base plate 5 and 6 on the one side.

The drive end 3*b* of the outer spindle 3 extends through the bearing 5*b* and thus through the first base plate 5 and then protrudes therefrom. The drive end 3*b* is coupled on the one hand to the drive motor 20 via a first gearing mechanism 21 and on the other hand to the inner spindle 7 via a second gearing mechanism 22. This will be explained in more detail below.

The guide rod 4 is fixedly connected, for example screwed, with one rod end 4*b* to the first base plate 5 and with another rod end 4*c* to the second base plate 6, whereby the guide rod 4 connects the base plates 5, 6.

The base plates 5, 6 are made of identical parts and preferably of plastic. For stiffening and axial securing of the bearings 5*b*, 5*c*, 6*a*, e.g. ball bearings, inserted there, the base plates 5, 6 are screwed together with sheet metal parts (not designated).

The brewing slide 2 comprises a substantially hollow cylindrical housing 2*b* having a circular cross-section and the brewing slide axis 2*a*. A brewing cylinder 12 having an interior 12*a*, which also has a circular cross-section, is arranged in the housing 2*b* coaxially with the brewing slide axis 2*a*. The brewing cylinder 12 has an opening made in its circumferential wall, which communicates with a filling opening 2*e* of the housing 2*b* of the brewing slide 2.

The inner space 12*a* of the brewing cylinder 12 of the brewing slide 2 accommodates the shower screen 9 and the plunger 10 in certain positions of the brewing unit 1, which will be described in more detail below. The shower screen 9 and the plunger 10 are displaceably guided relative to the brewing cylinder 12 in the interior space 12a in the directions of movement BR1 and BR2. When the shower screen 9 and the plunger 10 are both in certain positions of the brewing unit 1 in the inner space 12a, they face each other at different distances and define between them a space which is further referred to as the brewing chamber 12b (see FIGS. 5, 6, 7, 12, 14, 16).

The brewing slide 2 has a first end face 13 facing the first base plate 5.

A second end face 14 of the brewing slide 2 faces the second base plate 6, and the brewing slide 2 cooperates with the plunger 10 such that the brewing cylinder 12 of the brewing slide 2 is moved over the plunger 10 with the opening associated with the second end face 14.

The brewing slide 2 is guided displaceably in both directions of movement BR1 and BR2 on the one hand by the outer spindle 3 and on the other hand by the guide rod 4 between these base plates 5 and 6.

The guiding of the brewing slide 2 by means of the outer spindle 3 and the guide rod 4 takes place on both longitudinal sides of the housing 2b. For this purpose, the housing 2b of the brewing slide 2 has, on one longitudinal side of the guide by the guide rod 4, a guide bearing 2c at each end, through which the guide rod 4 extends. These guide bearings 2c are designed, for example, as plain bearings, but can of course also have other bearing elements.

A tubular drive section 2d is integrally formed on the other longitudinal side of the housing 2b, which has an outer spindle nut 15 at its center. The drive section 2d has a first end face 16 which faces the first base plate 5. A second end face 17 of the drive section 2d faces the second base plate 6.

The outer spindle 3 extends through the drive section 2d and the outer spindle nut 15. A movement thread 3e of the outer spindle 3 engages with the outer spindle nut 15, but the movement thread 3e disengages from the outer spindle nut 15 in end positions of the brewing slide 2. This will be further explained below in connection with FIGS. 6 and 7.

The shower screen 9 is fixedly connected to the inner spindle 7 and is displaceable by means of the latter in and into the interior 12a of the brewing cylinder 12 in the directions of movement BR1 and BR2. The shower screen 9 is inserted into the brewing cylinder 12 through the opening of the brewing cylinder 12 belonging to the first end face 13.

The inner spindle 7 comprises the inner spindle axis 7a, a movement thread 7b, a first spindle end 7c, a second spindle end 7d and a spindle section 7e without thread. Furthermore, the inner spindle 7 is in communication with a securing rod 7f having a rod axis 7g, two rod ends 7h, 7i and a securing tab 8 for the purpose of preventing rotation of the inner spindle 7.

Starting from the first spindle end 7c, which protrudes outside and to the right of the first base plate 5 in FIG. 5, the movement thread 7b adjoins the brewing slide 2 in the direction of movement BR1, which converges into a smooth spindle section 7e via a thread runout 7b-1. An outer diameter of the spindle section 7e is larger than an outer diameter of the movement thread 7b. The spindle section 7e has the second spindle end 7d of the inner spindle 7 at its free end. The second spindle end 7d is fixedly connected to the shower screen 9.

The inner spindle 7 extends with its movement thread 7b through the first base plate 6 through an inner spindle nut 27a. Here, the inner spindle nut 27a is part of an output gear 27 of the second gearing mechanism 22 and is rotatably supported and axially fixed in the bearing 5c in the base plate 6.

The securing rod 7f, also referred to as the tie rod, is arranged at a distance parallel to the inner spindle 7, with a first rod end 7b being fixedly connected to the securing tab 8. The securing tab 8 is in turn non-rotatably connected to the first spindle end 7c of the inner spindle 7, whereby the inner spindle 7 is prevented from rotating about its inner spindle axis 7a.

The securing rod 7f extends through an undesignated through-opening through the first base plate 6 parallel to the inner spindle 7 up to the shower screen 9 and is fixedly connected thereto. The securing rod 7f is displaceably guided in the base plate 6, performing the same displacement movement with the inner spindle 7 in the manner described above.

The movement mechanism of the brewing unit 1 is based on two threaded spindle drives, namely the outer spindle 3 and the inner spindle 7. The movement thread 3e of the outer spindle 3 and the movement thread 7b of the inner spindle 7 have different thread pitches.

The outer spindle 3 is coupled to the drive motor 20 via the first gearing mechanism 21, wherein the outer spindle 3 and the inner spindle 7 are synchronized with each other via the second gearing mechanism 22.

The gearing mechanisms 21 and 22 are designed here as traction means gearing mechanisms with toothed belts. It is also possible that the gearing mechanisms 21,22 could be constructed with toothed wheels or in combination with toothed belts. Also, one or both of the gearing mechanisms 21,22 could be multi-stage.

The first gearing mechanism 21 includes an input gear 23 which is non-rotatably connected to a shaft of a motor output 20b, an output gear 24 which is non-rotatably connected to the input end 3b of the outer spindle, and a toothed belt as a traction means 24. Here, the first gearing mechanism 21 is a reduction gear for matching the drive motor 20.

The second gearing mechanism 22 comprises an input gear 26, which is non-rotatably connected to the outer spindle 3 on an output section 3d thereof, the output gear 27 to the inner spindle nut 27a, and a toothed belt as traction means 28. The second gearing mechanism 22 serves as a synchronous gear for adjusting the inner spindle 7.

The outer spindle 3 is the drive shaft of the brewing unit 1 and provides linear movement of the brewing slide via the outer spindle nut 15, which is mounted on the brewing slide 2 in its drive section 2d to prevent it from rotating.

The coupling by means of the second gearing mechanism 22 via the toothed belt 28 with the output gear 27 simultaneously ensures a rotational movement of the inner spindle nut 27a, which is connected to the output gear 27. Here, the inner spindle nut 27a is formed into the output gear 27 and forms one component therewith (see also FIG. 4). Of course, two separate components coupled to each other may also be used. This inner spindle nut 27a thus simultaneously assumes the function of the inner toothed belt wheel as output gear 27. As a result, a linear movement of the shower screen 9, which is attached to the second spindle end 7d of the inner spindle 7, takes place. An anti-rotation device, which includes the securing rod 7f already described above, ensures that the shower screen 9 and the inner spindle 7 are not rotated about their own axis (inner spindle axis 7a), but merely move axially in the directions of movement BR1, BR2.

The movement thread 7b of the inner spindle 7 has a smaller pitch than the movement thread 3e of the outer spindle 3. For this reason, the speed of movement of the brewing slide 2 is many times greater than that of the shower screen 10 with the inner spindle 7. Advantageously, the pitch of the inner spindle 7 is selected so that it has a self-locking effect during the brewing process. This will be further explained below in connection with FIGS. 9 to 18.

This effect can be adjusted as desired by means of the transmission ratio of the second gearing mechanism 22 as a synchronous gear of the outer spindle 3 and inner spindle 7. This principle can be used to generate relative positions between the shower screen 9 and the brewing slide 2.

Figure 6:
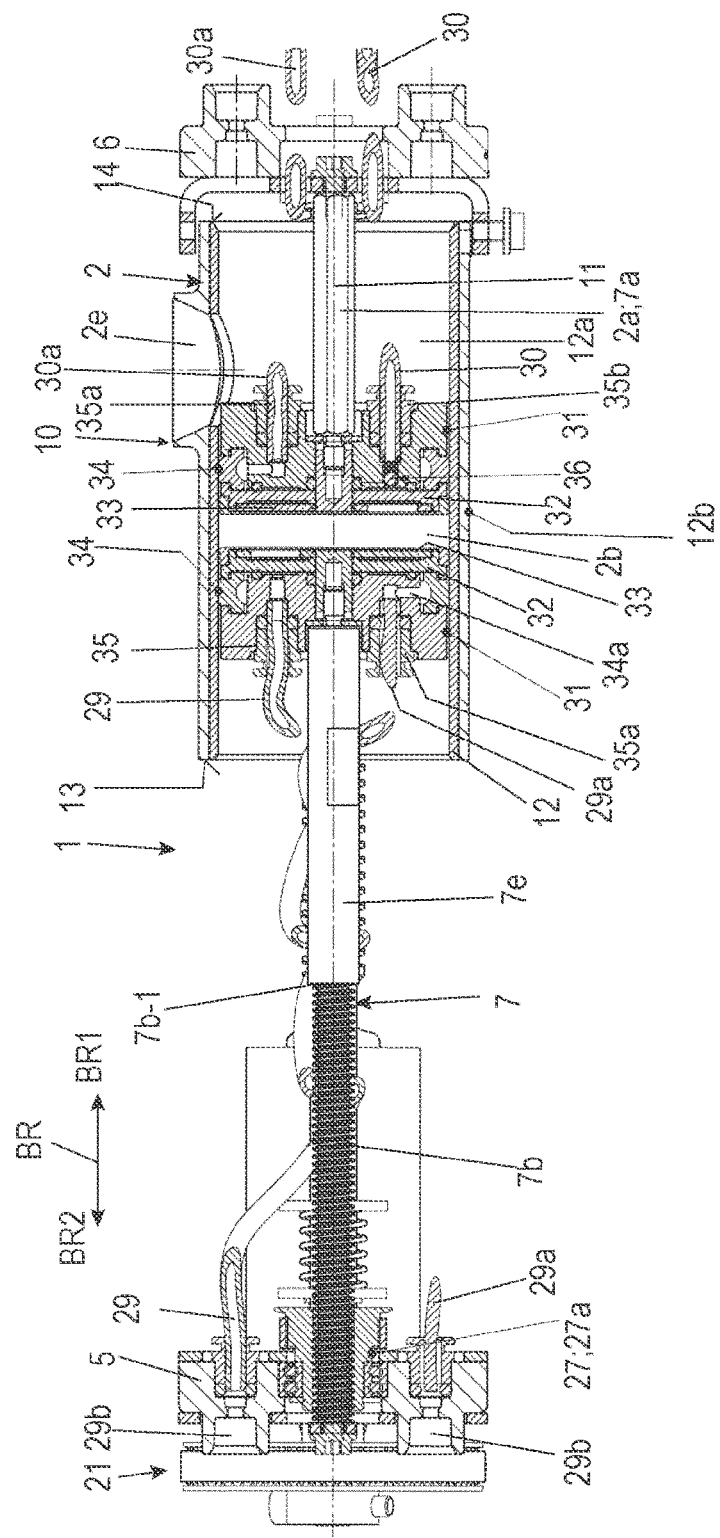

FIG. 6 shows a schematic sectional view according to line VI-VI of FIG. 2 and serves to further describe the shower screen 9 and the plunger 10. The brewing unit 1 is in one of two so-called end positions, which will be described in more detail below in connection with FIGS. 7 and 8.

In the exemplary embodiment shown, the shower screen 9 and the plunger 10 are constructed in such a way that they are composed of identical parts. These identical parts are each a first shell element 31, a second shell element 32, a screen element 33 and a seal 34. The first shell elements 31 are each centrally clamped to the second shell elements 32.

The first shell elements 31 each serve as a base and support for the respective second shell element 32 and the respective seal 34. The second shell elements 32 are formed as holders for one or more respective screen elements 33. A circumferential seal 34 is arranged in each case between the first shell element 31 and the second shell element 32. The outer diameters of the first shell elements 31, the second shell elements 32 and the seals 34 are equal in size here and correspond to an inner diameter of the interior 12a of the brewing cylinder 12. The first shell elements 31 are provided with hydraulic connections 35, 35a, 35b for connecting flexible hoses 29, 29a, 30, 30a. In this way, hydraulic inlets and outlets are integrated in shower screen 9 and plunger 10.

The shower screen 9 and the plunger 10 are arranged in the brewing unit 1 in such a way that their front sides face each other with the screen elements 33. These sides are hereinafter referred to as pressure sides, wherein the other sides of the shower screen 9 and the plunger 10 are referred to as rear sides. In the various positions still to be described in detail in connection with FIGS. 9 to 18, the space defined by these pressure sides of shower screen 9 and plunger 10 is referred to as brewing chamber 12b when shower screen 9 and plunger 10 are both positioned within brewing cylinder 12.

The connection 35 of the shower screen 9 is used to supply hot water through the screen element 33 into the brewing chamber 12b. The hot water is thereby atomized as uniformly as possible to wet all parts of a coffee cake present in the brewing chamber 12b with water. The hot water is supplied through the hose 29 from a connection 29b, not further described, on the second base plate 6. The associated functional assemblies for generating hot water are not shown here.

The further connection 35a of the shower screen 9 connects a seal connection 34a of the seal 34 to a further hose 29a for pressurized water, which the hose 29a feeds from a further connection 29b of the second base plate 6 for the seals 34 (if seals with water admission are used). Similarly, the seal 34 of the plunger 10 may be pressurized with water through the connection 35a and the hose 30a. In this way, the seals 34 are enlarged by the water pressure and ensure sealing of the brewing chamber 12b during a brewing operation.

The coffee extracted from the coffee cake in the brewing chamber 12b is dispensed through the screen element 33 of the plunger 10 through the connection 35b (brewing outlet) into a hose 30. The hoses 30, 30a connected to the plunger 10 are passed through an undesignated opening in the second base plate 6. The hoses 29, 29a; 30, 30a are formed here as so-called spindle-guided FEP tubes. Of course, other embodiments can also be used.

In the example shown, a valve 36 is disposed between the connection 35b of the plunger 10 and the second shell element 32. The valve 36 is called a crema valve, and here forms a spring-loaded oscillating component comprising a ball and a compression spring through which the coffee passes. The valve 36 allows only a small opening gap to produce the typical crema on the coffee.

By additionally mounting a crema nozzle consisting of the oscillating element (e.g. ball) and the spring element (e.g. compression spring), the shower screen 9 becomes the plunger 10, since both advantageously consist of the same components.

A third hydraulic connection, not shown, serves as another brewing outlet on the plunger side for an optional additional coffee strand that does not include a crema valve.

The screen element 33 of the plunger is often formed as a fine screen, so that very fine particles are not discharged with the freshly brewed coffee.

Advantageously, both the plunger 10 and the shower screen 9 are provided with the same fine screen as the screen element 33 to prevent the coffee powder from penetrating into the hydraulic inlet and outlet passages.

Figure 7:
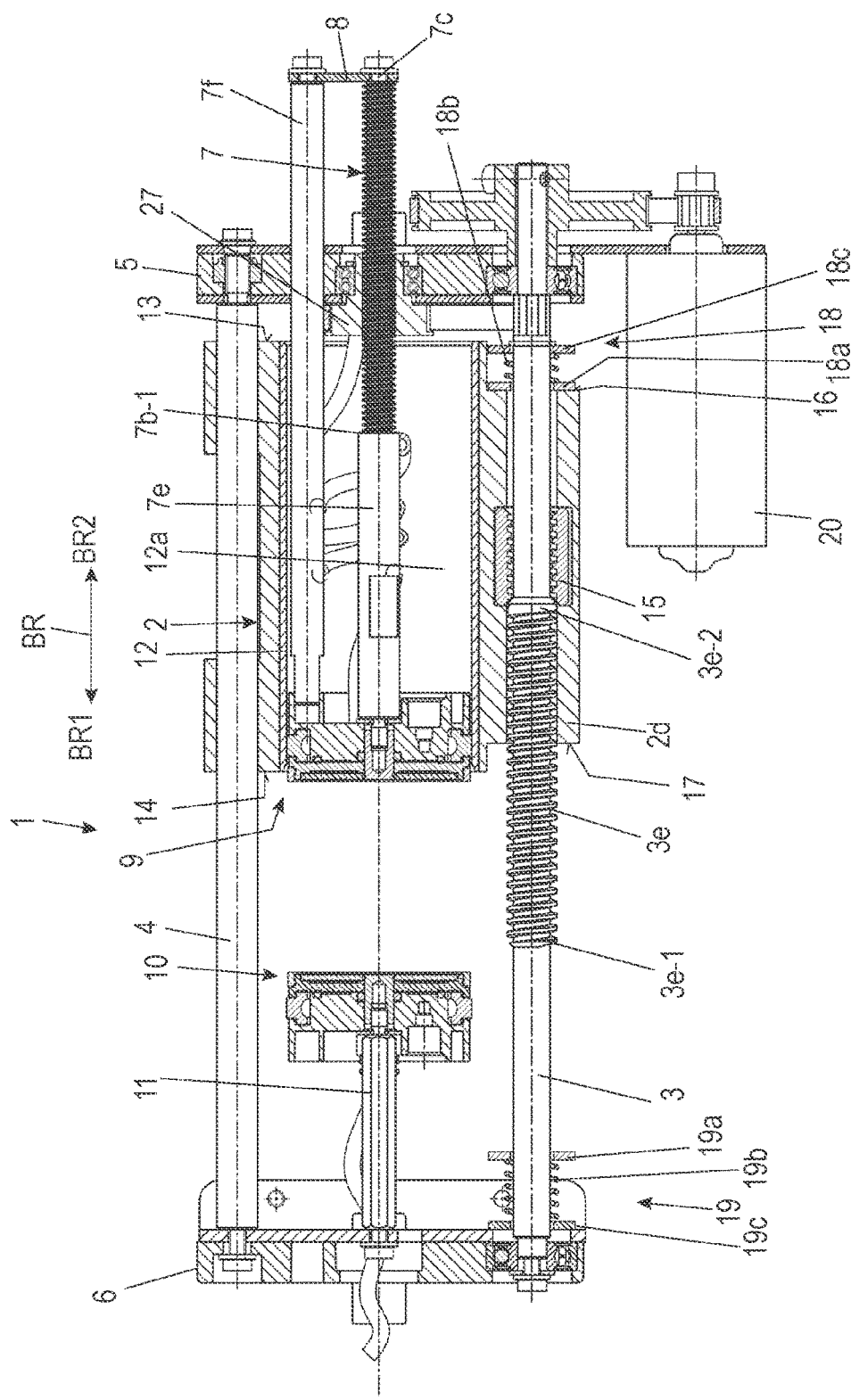
Figure 8:
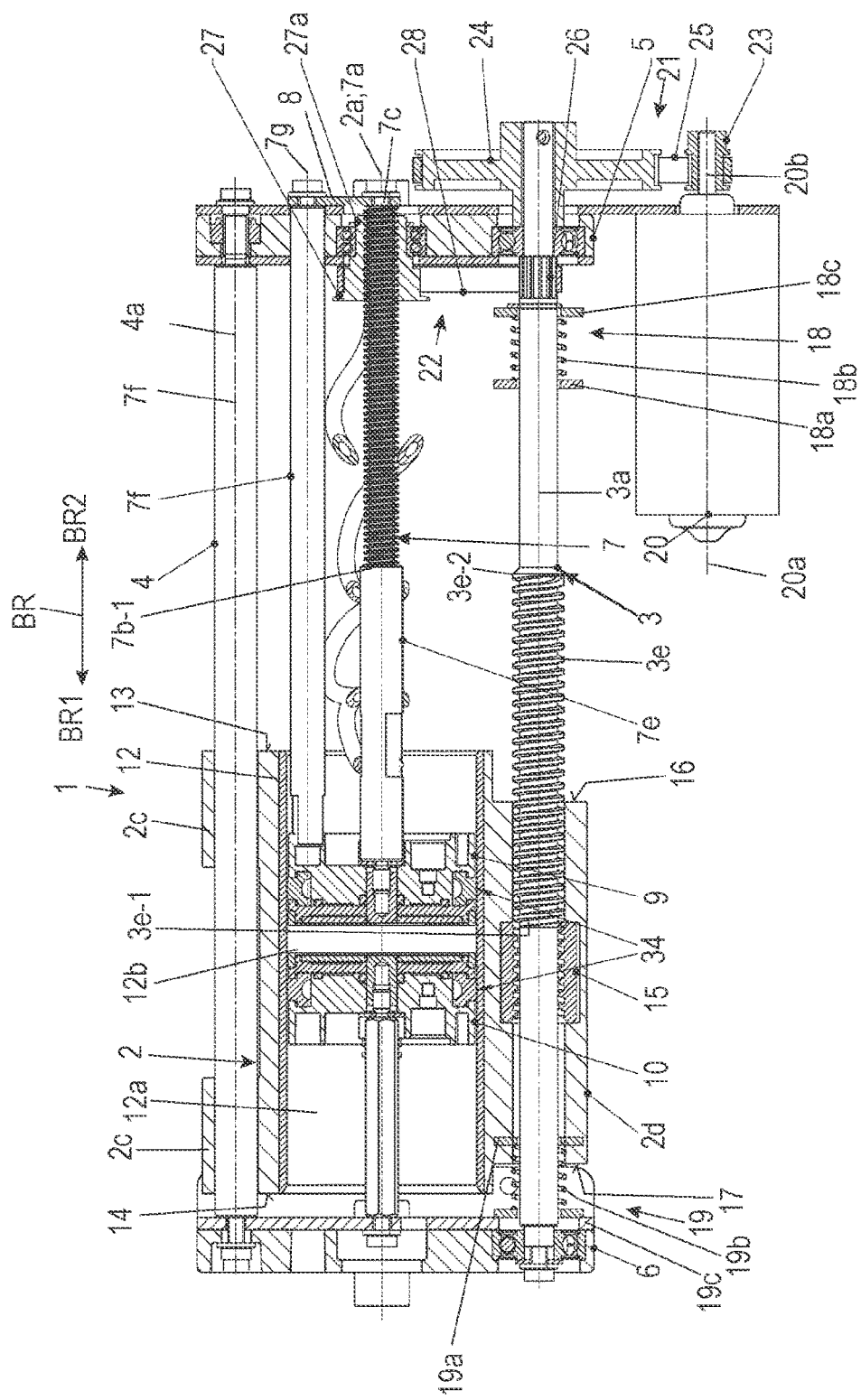

FIGS. 7 and 8 show schematic sectional views according to FIG. 5 in different end positions of the brewing unit 1 according to the invention.

In the first end position in FIG. 7, the brewing slide 2 is in an "open position" (see FIGS. 9, 10) or in a "grounds ejection position" (see FIGS. 17, 18)

The second end position shown in FIG. 8 is assumed by the brewing slide 2 of the brewing unit 1 in an "immersion position" (see FIGS. 13, 14) and also in a "closed position" (see FIGS. 15, 16).

The positions of the shower screen 9 with respect to the plunger 10 in the end positions will be further described below.

In the end positions of the brewing slide 2, the movement thread 3e of the outer spindle 3 comes out of engagement with the outer spindle nut 15 of the brewing slide 2. This is referred to as "spindle disengagement".

In order for the brewing slide 2 to be moved back out of these end positions, the outer spindle nut 15 of the brewing slide 2 must be re-engaged with the movement thread 3e of the outer spindle 3. This operation is referred to as "spindle re-engagement".

In the "spindle re-engagement" operation, the brewing slide 2 is moved toward the movement thread 3e rotating with the outer spindle nut 15 until the outer spindle nut 15 re-engages with the movement thread 3e.

For this purpose, the brewing unit 1 comprises at least one spindle re-engagement device. In order to distinguish the spindle re-engagement devices, a first spindle re-engagement device is provided for the first end position of the brewing unit 1 (see FIG. 7), wherein a second spindle re-engagement device is associated with the second end position of the brewing unit 1 (see FIG. 8).

When the brewing slide 2 is to be moved out of its respective end position again, the respective spindle re-engagement device exerts a force or a kind of movement impulse on the brewing slide 2 in such a way that the latter moves in the direction of the movement thread 3e and the outer spindle nut 15 engages with the movement thread 3e.

Such a spindle re-engagement device can be constructed in different ways.

Thus, in the exemplary embodiment shown in FIGS. 1 to 18, the spindle re-engagement devices comprise a first stop unit 18 and a second stop unit 19 each having a force storage element. This will be described in further detail below.

The spindle re-engagement device may also include friction elements, such as on the shower screen 9 or on the plunger 10. This will be discussed further below.

Furthermore, hydraulic sealing elements on the shower screen 9/on the plunger 10 can also be used specifically as spindle re-engagement devices, which will also be explained in more detail below.

Another way of implementing the spindle re-engagement device may be provided by means of a driver 37, which will be described in further detail in connection with FIGS. 19 to 30.

The spindle re-engagement devices may also include electromagnets, as discussed below.

In the exemplary embodiment shown in FIGS. 1 to 18, the spindle re-engagement devices comprise the first stop unit 18 and the second stop unit 19.

A stop unit 18, 19 is arranged on the outer spindle 3 in each of its sections which are close to the base plates 5, 6. The stop unit 18 is located at the output section 3d of the outer spindle 3 and is associated with the first base plate 6. The stop unit 19 is located at the bearing end 3c of the outer spindle 3 associated with the second base plate 5.

Each stop unit 18, 19 comprises a respective stop element 18a, 19a, a compression spring 18b, 19b and a disc 18c, 19c. The compression springs 18b, 19b are each arranged between the disc 18c, 19c and the stop element 18a, 19a, which are also formed here as discs, and form respective force storage elements. The disc 18c is axially fixed against the output section 3d of the outer spindle 3. The other disc 19c is in axially fixed contact with the second base plate 6. The compression springs 18b, 19b and the stop elements 18a, 19a are each axially slidable on the outer spindle 3.

As soon as the brewing slide 2 moves in the direction of movement BR2 towards the first stop unit 18 in FIG. 7 on the first base plate 5 into the associated end position and reaches the first stop unit 18, the stop section 16 of the drive section 2d of the brewing slide 2 first comes into contact with the stop element 18a of the stop unit 18. Then, upon further movement, the compression spring 18b is pretensioned against the stationary disc 18c and the outer spindle nut 15 is disengaged from the movement thread 3e of the outer spindle 3.

During "spindle disengagement", the movement thread 3e and the outer spindle nut 15 disengage, and then a thread runout 3e-2 of the movement thread 3e is moved out of the outer spindle nut 15.

At this moment, the brewing slide 2 is in rest position, i.e. the speed of the brewing slide 2 is zero, even if the outer spindle 3 continues to rotate ("grounds ejection position"). This moment is shown in FIG. 7. However, in this case, the inner spindle 7 continues to move until the beginning of the spindle section 7e comes into abutment with the stationary output gear 27 at a thread runout 7b-1 of the movement thread 7b of the inner spindle 7 ("open position"). This will be further described in connection with FIGS. 9, 10; 17, 18.

If the direction of movement of the outer spindle 3 is now reversed, the spring force of the compression spring 18b ensures that immediate spindle re-engagement of the brewing slide 2 is carried out, i.e. the thread runout 3e-2 of the movement thread 3e of the outer spindle 3 comes into engagement with the outer spindle nut 15 again.

In the second end position shown in FIG. 8, the spindle disengagement and spindle re-engagement of the movement thread 3e of the outer spindle 3 and outer spindle nut 15 are performed in a similar manner.

As soon as the brewing slide 2 moves in the direction of movement BR1 toward the second end position in FIG. 8 on the second base plate 6, first the stop section 17 of the drive section 2d of the brewing slide 2 comes into contact with the stop element 19a of the stop unit 19. Then, with further movement, the compression spring 19b is pretensioned against the stationary disc 19c and the outer spindle nut 15 is disengaged from the movement thread 3e of the outer spindle 3. The movement thread 3e comes out of engagement with the outer spindle nut 15, wherein a thread runout 3e-1 of the movement thread 3e is moved out of the outer spindle nut 15.

Also in this case, the brewing slide 2 is in rest position, i.e. the speed of the brewing slide 2 is zero, even if the outer spindle 3 continues to rotate ("immersion position"). At the same time, the inner spindle 7 also continues to rotate until the tab at the first spindle end 7c of the inner spindle 7 comes into abutment with the stationary first base plate 5 ("closed position"). This will be further explained in connection with FIGS. 13 to 16.

When the direction of movement of the outer spindle 3 is reversed again, the spring force of the compression spring 19b ensures that immediate spindle re-engagement of the brewing slide 2 is carried out, i.e. the thread runout 3e-1 of the movement thread 3e of the outer spindle 3 comes into engagement with the outer spindle nut 15 again.

In order to reduce the frictional noise and the wear behavior of the outer spindle nut when it overlatches during "spindle disengagement" in the respective end position of the brewing slide 2, an additional friction element (e.g. O-ring) can be used which acts between the shower screen 9 and the inner wall of the interior 12a of the brewing cylinder 12. Since the shower screen 9 never leaves the interior 12a of the brewing cylinder 12 and both components are always driven synchronously in the same direction of movement BR, this additional friction element as a damping element reduces the contact force of the outer spindle nut 15 on the movement thread 3e of the outer spindle 3 by the respective compression spring 18b, 19b. Only when the direction of rotation is reversed can the respective compression spring 18b, 19b develop its full effect for re-spindle engagement. Disadvantages of this additional friction element are additional friction losses when moving to the different positions and stick-slip effects when the brewing cylinder 12 is dry and wetted with coffee grounds.

Friction elements on the movable inner spindle 7 in cooperation with the brewing slide 2, i.e. with its brewing chamber 12b, may also be useful for spindle re-engagement, in particular on the shower screen 9 (or on the plunger 10 if this is movable instead of the shower screen 9 and the shower screen 9 is stationary). As a result of the frictional force between the shower screen 9 and the brewing chamber 12 or the brewing slide 2, which is provided by the friction element, the outer spindle nut 15 of the brewing slide 2 is forced back into engagement with the associated external thread (movement thread 3e) of the outer spindle 3 for spindle re-engagement as soon as a reversal of movement occurs at the inner spindle 7. In this constellation, the first spindle re-engagement device comprises at least one such friction element, for example in the form of an O-ring.

Such a friction element can also be formed as a hydraulic sealing element. The already existing seal 34 is suitable for this purpose. These seals 34 on the plunger 10/*shower* screen 9 can be used specifically for this function. By a time-delayed relief of the seals 34 after reversal of the direction of the inner spindle 7, a high frictional force is transmitted to the brewing slide 2 and this is briefly synchronized with the axial movement of the inner spindle 7 (for example in the direction of movement BR2 in FIG. 23). This results in a movement impulse on the brewing slide 2 as a spindle re-engagement. It is advantageous that the increased friction is no longer present in the remaining course of movement after seal relief. This avoids additional wear of the moving components.

The application of a suitable water pressure to the seals 34 may be performed jointly or separately via controlled valves, for example solenoid valves. A control device of the brewing unit 1, which is not shown, can perform a suitable control of the solenoid valves and thus of the seals 34.

A further possibility for avoiding the described overlatching of the outer spindle nut 15 is to hold the brewing slide 2 in a respective end stop by means of a respective electromagnet, which is switched on to hold the brewing slide 2. Advantageously, the inner spindle 7 can then be moved independently of the outer spindle 3 even when the direction of rotation is reversed. The brewing slide 2 can be released to a defined position point of the inner spindle 7 when the respective electromagnet is switched off. Such electromagnets are not shown, but can be easily imagined with the following description in connection with FIGS. 7 and 8.

Such an electromagnet may be arranged between an inner side of the first base plate 5 and the end face 13 of the brewing slide 2 for the end position shown in FIG. 7, and may be attached to the first base plate 5. Similarly, this applies to the electromagnet for the end position shown in FIG. 8. Here, the electromagnet is arranged between an inner side of the second base plate 6 and the other end face 14 of the brewing slide 2 and is attached to the second base plate 6.

It is also conceivable that two or more electromagnets are provided per end position. Ring-shaped electromagnets, the diameter of which corresponds to that of the respective end face 13, 14 of the brewing slide 2, could also be used.

Furthermore, it is also conceivable that the respective electromagnet actuates a mechanical locking of the brewing slide 2, for example with the respective base plate 5, 6 in the respective end position. Such a mechanical locking device of the brewing slide 2 may be designed in such a way that, when it is released, it is moved by the electromagnet which has triggered the locking operation, in such a way that the mechanical locking device, for example by means of a lever or a movable cam, executes a movement pulse on the brewing slide 2 for spindle re-engagement. This can be done, for example, by a spring tensioned during locking or/and by another electromagnet. Here, the spindle re-engagement devices comprise the electromagnet(s) and the locking device.

A further embodiment of the spindle re-engagement devices has at least two electromagnets per end position of the brewing slide 2. Here, one of the two electromagnets is fixedly mounted, for example on the base plate 5, 6. The other of the two electromagnets is in each case attached to the brewing slide 2 opposite the one stationary electromagnet. For the electrical supply of the electromagnets, a DC voltage is provided which can be reversed in polarity, for example via a relay changeover contact or semiconductor switch, in order to act on one of the two electromagnets. For this purpose, when the brewing slide 2 assumes the end position, the two opposing electromagnets are switched by their current supply in such a way that poles of opposite polarity are opposite each other for attraction. For spindle re-engagement, the polarity of one of the two electromagnets is reversed so that like poles of the two electromagnets oppose and repel each other, thereby applying the motion pulse to the brewing slide 2 for spindle re-engagement. During the adjustment operation of the brewing slide 2 outside the end positions, the power supply to the electromagnets may be switched off to save energy.

It is also conceivable that an electromagnet with a movable, for example longitudinally displaceable or/and rotatable/pivotable core is attached to the base plate 5, 6. When the end position is assumed, the electromagnet is switched on, the core is retracted against a spring force and the brewing slide 2 is held in the end position by the switched-on force of the electromagnet. For the spindle re-engagement operation, the electromagnet is switched off and the force of the tensioned spring presses on the movable core, which in turn exerts the movement impulse on the brewing slide 2 for spindle re-engagement operation. In this case, the spindle re-engagement devices comprise the electromagnet(s) with the movable core.

As a result of the two toothed belt wheels (input gear 26, output gear 27) of the second gearing mechanism 22 (see FIGS. 4, 5), the transmission ratio of the second gearing mechanism 22 between the outer spindle 3 and the inner spindle 7 can be further adjusted. If the diameter of the output gear 27 is smaller than a diameter of the input gear 26, when coffee powder is pressed between the shower screen 9 and the plunger 10 in the brewing chamber 12b (this will be described further below), the transmission ratio at the inner spindle 7 is more powerful, so that a gearless drive motor 20 is able to implement the required pressing forces between the shower screen 9 and the plunger 10. The comparably low torque for moving the outer spindle 3 is also sufficient for positioning the brewing slide 2. At this point, a greater speed is required.

It may be advantageous if the first gearing mechanism 21 is arranged between the drive motor 20 and the outer spindle 3 as a reduction gear. In the exemplary embodiment shown (e.g. FIG. 5), this first gearing mechanism 21 has one gear stage. Of course, two or more gear stages may also be possible. In this way, very many transmission ratios are constructively possible by suitable selection of the spindle pitches of the movement thread 3e of the outer spindle 3 and the movement thread 7b of the inner spindle 7, and also of the transmission ratios of the gear units 21, 22. The selection of a drive motor 20 for the brewing unit 1 is thus very flexible. With a comparatively reduced-power drive motor 20, both high travel speeds and contact forces between the shower screen 9 and the plunger 10 which can be adjusted over a large span can be realized.

The embodiment described in the document EP 2 907 427 A1 describes a non-linear gear section in which the compromise between high pressing forces and simultaneously short travel cycles is achieved. For moving to the different positions, the functional elements are moved with large pitches. When compacting the coffee powder, the drive motor is reduced with a significantly smaller pitch in order to transmit large forces with the same guide. The decisive difference to the brewing unit 1 according to the invention shown here is that the transmission ratio between the drive motor 20 and the functional groups of the brewing unit 1 changes non-linearly. All transmission ratios in the double-spindle principle according to the invention with the outer spindle 3 and inner spindle 7 are constant, i.e. the movement threads 3e, 7b of the spindles 3, 7 have constant pitches, and the transmission ratios of the gear mechanisms 21, 22

(possibly also gearwheels) are constant. As a result of the aforementioned spindle disengagement of the brewing slide 2, the standstill of the brewing slide 2 and thus of the brewing cylinder 12 is realized, so that in this case no transmission process takes place.

FIGS. 9 to 18 show schematic views of the brewing unit 1 according to the invention in various positions. Thereby, FIGS. 9, 11, 13, 15, 17 each show top views of the brewing unit 1 in which the positions of the brewing slide 2 are clearly shown. FIGS. 10, 12, 14, 16, 18 are respectively arranged thereunder and each show a horizontal sectional view thereof. In these sectional views, the positions of the brewing slide 2, the shower screen 9 and the plunger 10 can be seen in relation to each other.

FIGS. 9 and 10 show an "open position". FIGS. 11 and 12 show a "filling position". An "immersion position" is shown in FIGS. 13 and 14. FIGS. 15 and 16 show a "closed position", and FIGS. 17, 18 show a "grounds ejection position".

These various positions of the brewing unit 1 characterize the overall functionality of the brewing unit 1. The "open position" (FIGS. 9, 10) is of particular importance, because the control system of the brewing unit 1 can clearly reference the brewing function elements to each other here. Here, the inner spindle 7 reaches its end stop at the thread runout 7b-1 on the spindle section 7e in the associated inner spindle nut 27a. In this case, the brewing slide 2 is disengaged on the piston drive side, i.e. the thread runout 3e-2 of the movement thread 3e of the outer spindle 3 is disengaged from the outer spindle nut 15 and the drive section 2d of the brewing slide 2 is in contact with the stop element 18a of the first stop unit 18 with its stop section 16. This has already been described in detail above in connection with FIG. 7. Here, the piston drive side is to be understood as the side of the brewing unit 1 with the gear mechanisms 21, 22.

In the "open position", the shower screen 9 closes the filling opening 2e in the brewing slide 2. The plunger 10 is free to stand in its place fixed by the plunger holder 11.

From this starting position, the "filling position" (FIGS. 11, 12) can be repeatedly approached with positional accuracy via a certain angle of rotation of the outer spindle 3. In this case the brewing slide 2 lies approximately centrally between the two base plates 5, 6. The brewing slide 2 has moved with the opening of the brewing cylinder 12 over the edge of the pressure side of the plunger 10, which thus forms an incipient closure of the brewing chamber 12b. The shower screen 9 has simultaneously continued to move in the direction of movement BR1 towards the plunger 10. The brewing chamber 12b is now accessible through the filling opening 2e by coffee powder to be filled in.

In the subsequent "immersion position" (FIGS. 13, 14), the brewing slide 2 is already disengaged on the opposite drive side, as already described in detail in connection with FIG. 8 above. In this case, the shower screen 9 has been retracted into the brewing cylinder 12 to such an extent that its seal 34 and the seal 34 of the plunger 10 both lie within the brewing cylinder 12 and seal the closed brewing chamber 12b. If the seals 34 are not simple O-rings, they may now be subjected to water pressure to activate the sealing function. In this position, the distance between the plunger 10 and the shower screen 9, with the correspondingly formed brewing chamber 12b, limits the maximum possible coffee powder weight for slightly compressed dry powder without major compaction. For larger weights of more than, for example, 15g, there is the possibility of approaching the "immersion position" with a coffee powder portion and then grinding in a second time in the "filling position" before coffee extraction begins.

During the extraction of the ground coffee, the density of the coffee grounds increases and this can be pressed out with the maximum possible piston force of the shower screen 9 after completion of the brewing process. The maximum pressing-out position ("grounds ejection position"—FIGS. 17, 18) is always reached, because when the direction of the drive or the outer spindle 3 is reversed, the brewing slide 2 overtakes the shower screen 9 and a defined grounds ejection occurs. Overfilling of the brewing unit 1 is thus avoided. The difference in speed between the brewing slide 2 and the plunger 10/*shower* screen 9 and the shear forces acting on the coffee cake result in a defined ejection position in the "grounds ejection position".

In the "grounds ejection position", the brewing slide 2 is in the end position on the first base plate 5, with the shower screen 9 still in the brewing cylinder 12, but with the screen element 33 and part of the second shell element 32 protruding slightly from the brewing cylinder 12. Thereby, the coffee cake (coffee grounds) falls slightly from the screen element 33 of the shower screen 9 and can be collected in a container (not shown) of the coffee machine (not shown). This grounds container is arranged, for example, in an area below the space between the plunger 10 and the end face 14 of the brewing slide 2. This is easily understood in connection with FIGS. 17, 18. This "grounds ejection position" also simultaneously forms a "grind-through position" of coffee powder directly into the grounds container.

Finally, there is the "closed position" (FIGS. 15, 16), in which the plunger 10 and the shower screen 9 are moved together to the maximum extent, provided that no coffee powder has been ground in.

Advantageously, the pitch of the inner spindle 7 is chosen so that it acts in a self-locking manner during the brewing process. This avoids a backward movement of the shower screen 9 (or the plunger 10, depending on the construction) due to the brewing pressure, so that a special current supply to the drive motor 20 (counter-holding) is not necessary during this process. Consequently, the drive motor 10 has less energy losses.

A referencing of the positions of the brewing slide 2, the shower screen 9 or the plunger 10 (depending on the arrangement) can, in the case that the drive motor is a stepper motor, be effected by its number of steps or angle of rotation by means of the associated control system. It is also possible that the different positions are defined by electro-mechanical limit switches, proximity switches, light barriers or Hall sensors (also additionally). A further possibility is formed by rotary encoders of various designs, which are connected, for example, to the outer spindle 3 and/or the inner spindle 7 in a rotationally fixed manner.

Figure 19:
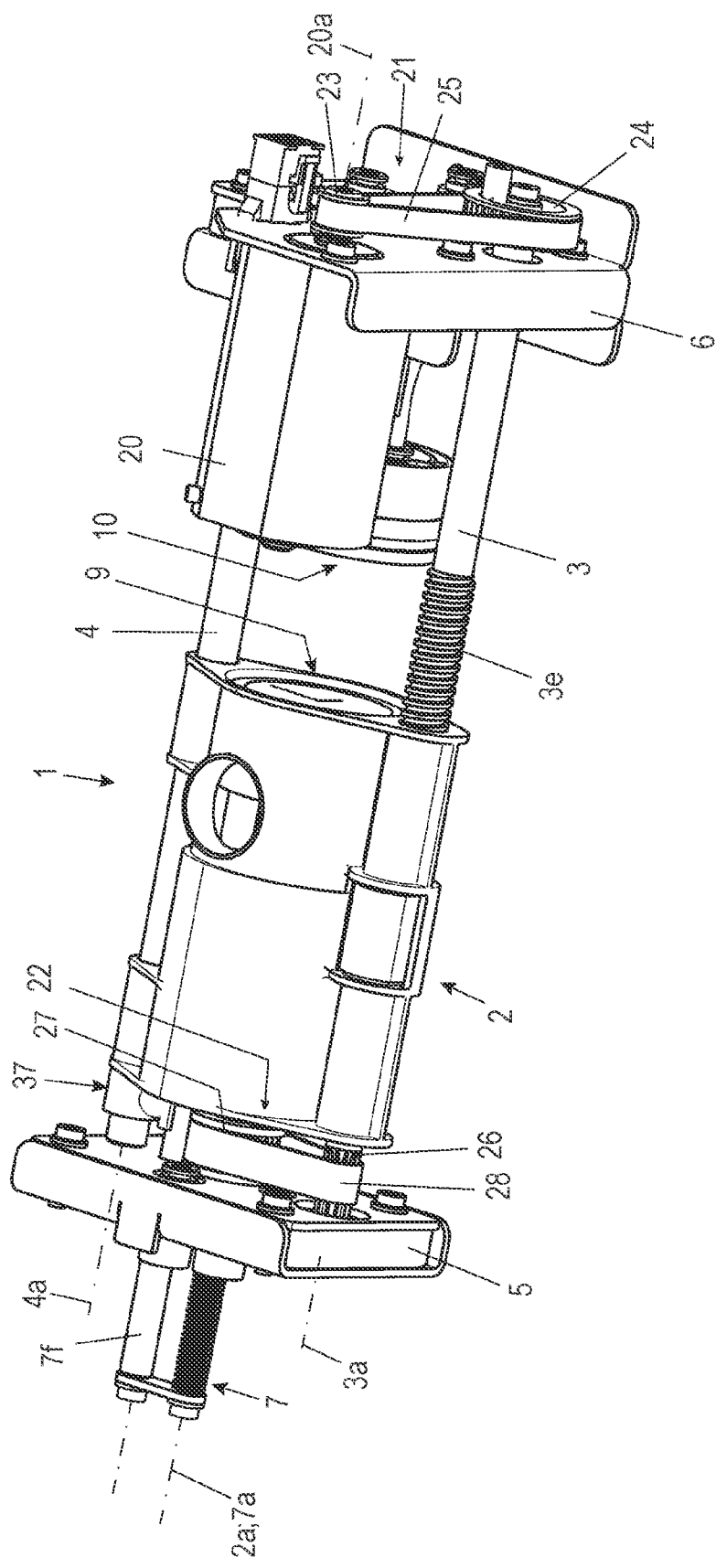
FIGS. 19-20 show schematic perspective views of a variation of the exemplary embodiment according to FIG. 1 with a driver.
Figure 20:
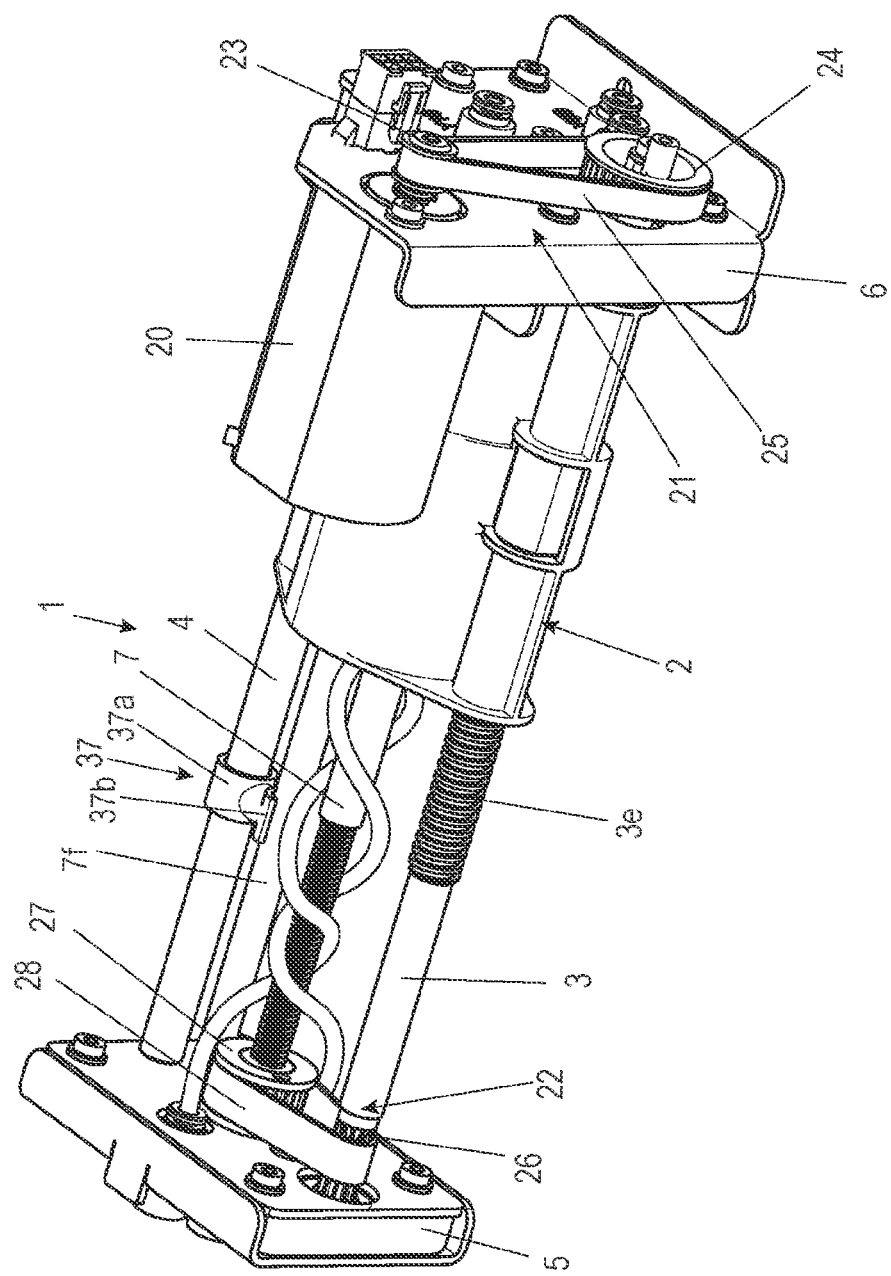

In FIGS. 19-20, schematic perspective views of a variation of the exemplary embodiment according to FIG. 1 with a driver device as a component of the first spindle re-engagement device are shown.

The variant of the brewing unit 1 is shown in FIGS. 19-20 in the second end position.

In contrast to the exemplary embodiment according to FIG. 1, the drive motor 20 is arranged on the second base plate 6 together with the first gearing mechanism 21, wherein the second gearing mechanism 22 remains on the first base plate 5. The drive motor 20 is located centrally above the outer spindle 3 and guide rod 4.

Figure 21:
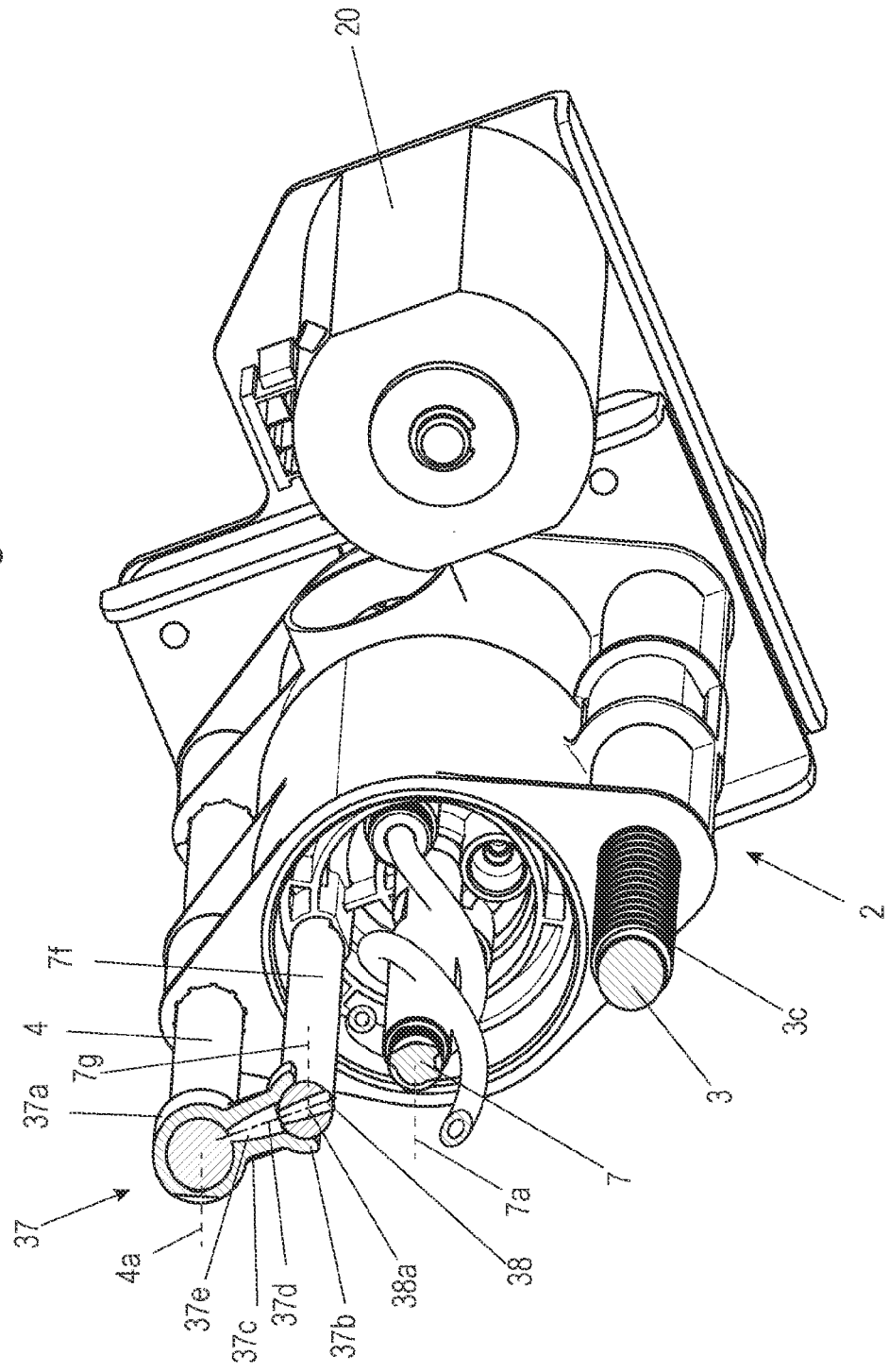
FIG. 21 shows a schematic sectional view of the driver according to FIGS. 19-20.

The first spindle re-engagement device is provided here with a driver device. The driver device is shown in FIG. 21 in a schematic sectional view according to FIGS. 19-20.

The driver device includes a driver 37 having a first retaining element and a second retaining element corresponding to the first retaining element.

The driver 37 is arranged on the side of the movable inner spindle 7 as a friction element on the entrained securing rod 7f (anti-rotation device) and on the guide rod 4 so as to be displaceable. By means of the driver 37, the necessary movement impulse is exerted on the brewing slide 2 for spindle re-engagement of the outer spindle nut 15 and the movement thread 3e of the outer spindle 3. This will be further described below. The driver 37 can be moved in the other positions of the brewing slide 2 without blocking the brewing slide 2.

The driver 37 comprises an annular retaining section 37a and a guide section 37b, approximately semi-circular in section, which here has two quarter-circular elements each connected to the retaining section 37a by a connection 37c.

In the example shown, a permanent magnet, for example in the form of a bar magnet, is inserted as a first retaining element in a pocket 37e within the connection 37c in the driver 37. The bar magnet is symbolically indicated here by an axis 37d.

An oppositely poled permanent magnet, for example also formed as a bar magnet, is arranged as a second retaining element in a receptacle 38 in the securing rod 7f. This magnet is symbolically indicated by an axis 38a.

The driver 37 is slid with its annular retaining section 37a onto the guide rod 4 and is arranged to be displaceably guided on the latter in its longitudinal direction (guide axis 4a) with a certain frictional resistance. Thereby, the guide section 37b is in contact with the securing rod 7f. The two quarter-circular elements of the guide section 37b are thereby also displaceably guided with a certain frictional resistance on the side of the securing rod 7f which faces the guide rod 4.

In a rest position of the driver 37, which is shown in FIG. 21 in a sectional view, the axis 37e of the bar magnet in the driver 37 and the axis 38a of the magnet in the receptacle 38 in the securing rod 7f are aligned. In this rest position, the frictional resistance or a retaining force between the driver 37 and the securing rod 7f is increased due to the attractive force of the magnets, i.e. greater than that outside the rest position. Thereby, the driver 37 is held in this rest position by the magnetic force of the two magnets attracting each other. The term rest position means here that the driver 37 does not perform any relative movement with respect to the securing rod 7f and does not change its position with respect to the securing rod 7f.

When the securing rod 7f moves axially during an adjustment, the driver 37 continues to be held in the rest position due to the two magnets attracting each other and is moved along with the securing rod 7f. At the same time, the guide section 37b slides on the guide rod 4 and is thus slidably guided thereon.

Figure 28:
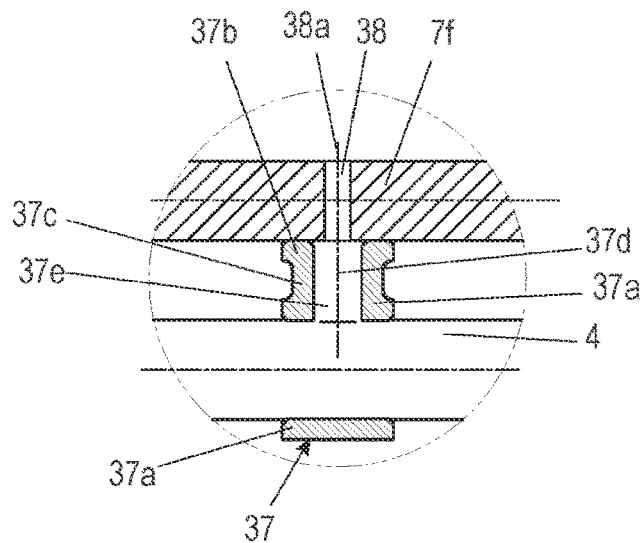
FIGS. 28-30 show enlarged schematic sectional views of the driver in the various positions according to FIGS. 22-27.
Figure 29:
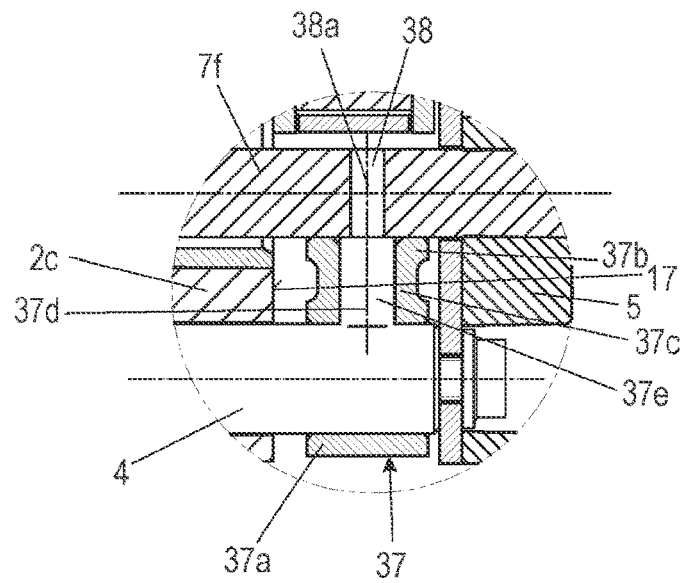
Figure 30:
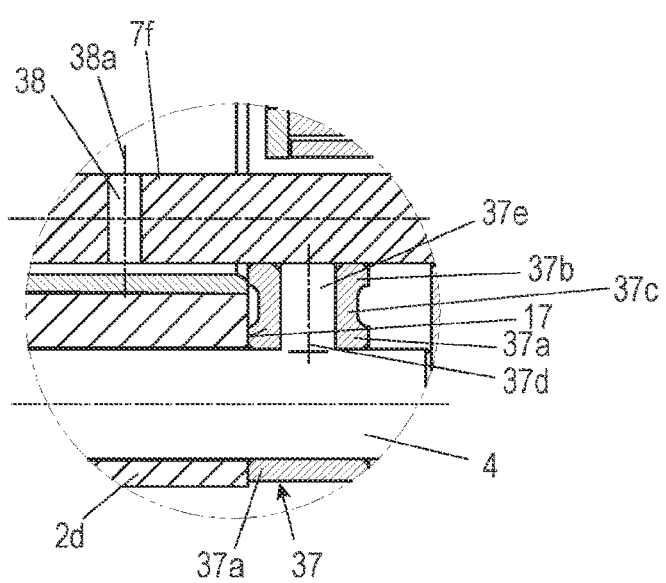

FIGS. 22-27 show schematic views of the variation according to FIGS. 19-20 in various positions. FIGS. 28-30 represent enlarged schematic sectional views of the driver device (circle markings) in the various positions according to FIGS. 22-27.

Figure 26:
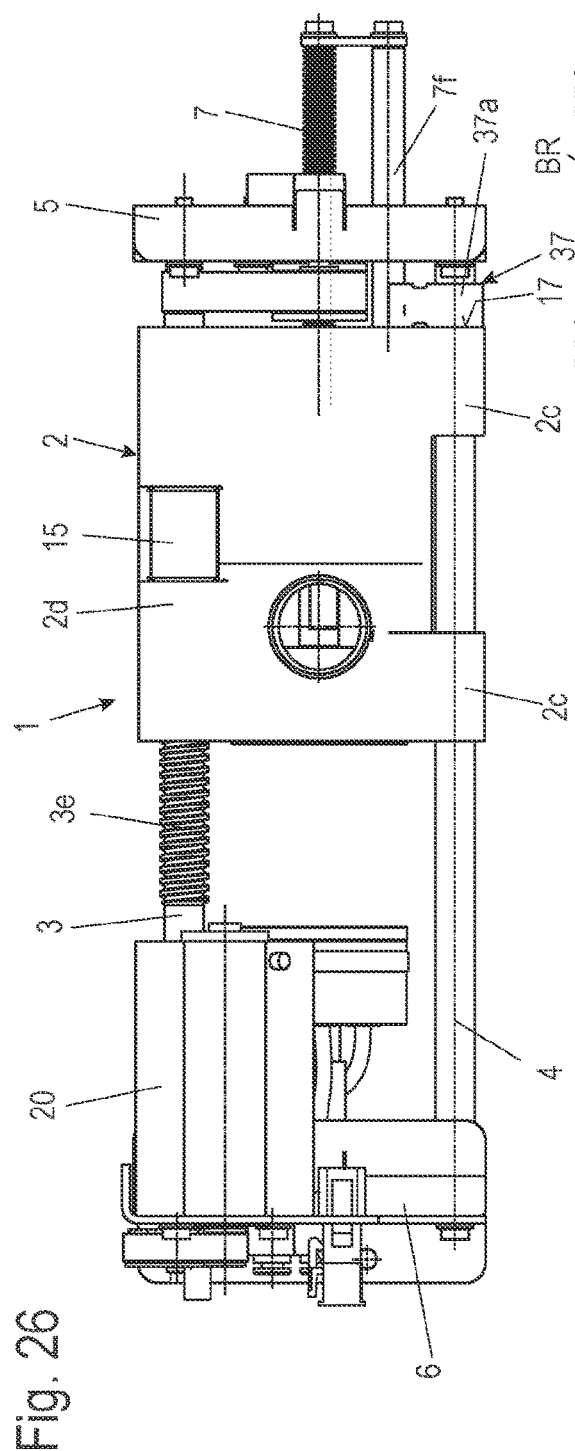
Figure 27:
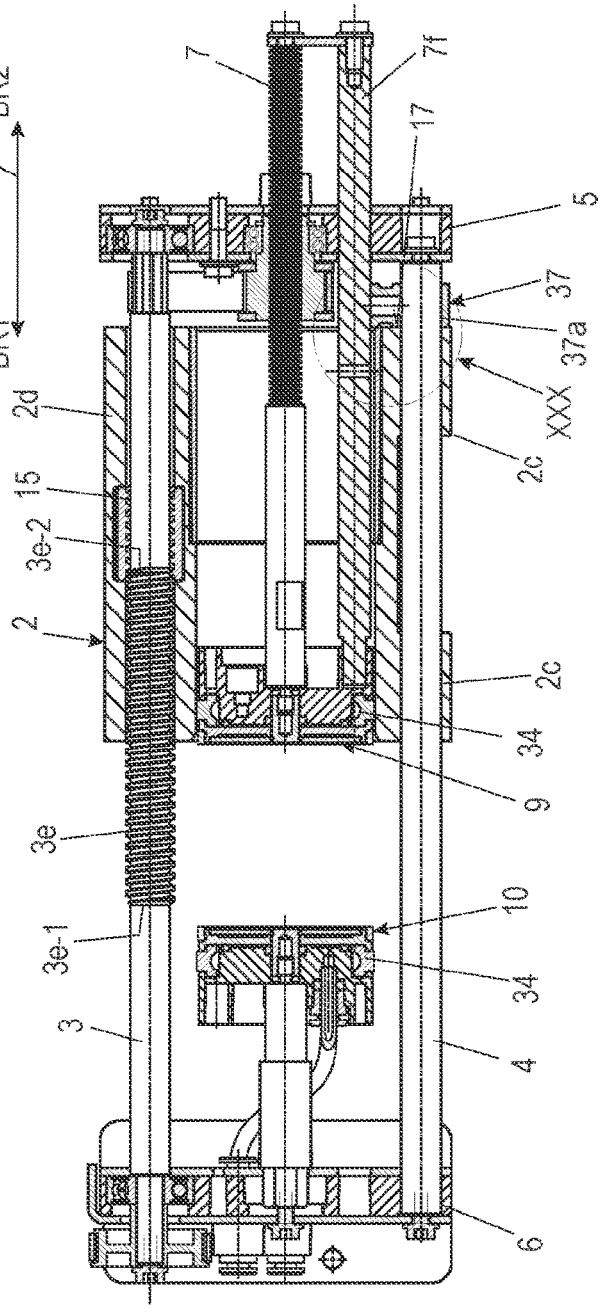

FIGS. 22, 24, 26 each show a side view of the brewing unit 1 in different positions, with FIGS. 23, 25, 27 each showing a longitudinal sectional view of the brewing unit 1 in a common plane of the outer spindle 3, guide rod 4, inner spindle 7 and securing rod 7f for this purpose.

In each case, only the first spindle re-engagement device with the driver device is shown. The second spindle re-engagement device can be provided here, for example, by the seal 34 of the shower screen 9 (as already described above). Of course, other embodiments as described above, also in combinations, are possible.

The position of the variant of the brewing unit 1 in FIGS. 22 and 23 corresponds to the second end position of the brewing unit 1 shown in FIG. 8. The outer spindle nut 15 and the movement thread 3e are disengaged. The driver 37 of the driver device of the first spindle re-engagement device is in the rest position, and the axes 37e and 38a are aligned. This is shown enlarged in FIG. 28. Spindle re-engagement can be performed by the second spindle re-engagement device, which is not shown.

In FIGS. 24 and 25, the first end position (see FIG. 7) of the variant of the brewing unit 1 is shown. The outer spindle nut 15 and the movement thread 3e are disengaged. The driver 37 of the driver device of the first spindle re-engagement device is initially in the rest position, with the axes 37e and 38a aligned (see enlarged illustration in FIG. 29). The driver 37 is close to the first base plate 5, but does not contact it.

As soon as the shower screen 9 is now moved in the direction of movement BR2 towards the opposite second base plate 6, the inner spindle 7 and the securing rod 7f coupled thereto are adjusted in the direction of movement BR2. Since the outer spindle nut 15 and the movement thread 3e are still disengaged, the brewing slide 2 remains in the first end position. In this case, the driver 37 located on the securing rod 7f is carried along by the securing rod 7f due to the magnetic adhesion and is pressed against the stop section 17 of the brewing slide 2. Until then, the driver 37 remains in its rest position due to the magnetic adhesion. Upon further movement of the securing rod 7f, the magnetic adhesion of the driver 37 now resting against the still immobile brewing slide 2 is overcome. The securing rod 7f then continues to slide in the retaining section 37a of the now retained driver 37. At this moment, the driver 37 exerts a movement impulse on the brewing slide 2, allowing the spindle re-engagement of the outer spindle nut 15 and the movement thread 3e to take place. This can be seen in FIGS. 26 and 27.

FIG. 30 shows the situation of the driver device. The axes 37e and 38a are no longer aligned. The driver 37 is in contact with the stop section 17 of the brewing slide 2 via end faces of guide section 37a and retaining section 37b.

Instead of the magnetic adhesion in the rest position of the driver 37 on the securing rod 7f, another frictional adhesion can also be realized, for example, by a ball pressure element subjected to spring force. The ball pressure element is then in contact in the rest position of the driver 37 with a corresponding indentation or groove instead of the receptacle 38 in the securing rod 7f. The adhesive force of this connection is large enough for the movement impulse for spindle re-engagement of the outer spindle nut 15 and the movement thread 3e, but small enough to prevent jamming of the brewing unit 1.

The spindle re-engagement device(s) can be arranged on one or both sides. The spindle re-engagement devices can have the functional units described above, also in different combinations.

The invention is not limited by the above exemplary embodiment, but is modifiable within the scope of the claims.

It is conceivable that the movement functionality of the shower screen 9 and the plunger 10 in the brewing unit 1 can also be interchanged with each other, i.e. arranged laterally reversed.

At this point, reference should be made to constructions which are referred to by the applicant as "German piston". In reference to the filter coffee typical for Germany, a crema is deliberately omitted so that the piston coffee obtains filter coffee-like properties. If both brewing outlets of the plunger 10 are connected with a 2/2-way valve, it is possible to produce a product-specific crema. It is possible to define products that are dispensed either with or without crema.

Instead of the two base plates 5, 6, a frame could also be used.

For the ejection of the coffee grounds, it is conceivable that a kind of pusher with brush and water spray can be used.

It is also conceivable that the driver 37 is also slidably attached to the inner spindle 7 or to a component connected to the inner spindle 7 other than the securing rod 7f.

LIST OF REFERENCE SIGNS

1 Brewing unit
2 Brewing slide
2a Brewing slide axis
2b Housing
2c Guide bearing
2d Drive section
2e Filling opening
3 Outer spindle
3a Outer spindle axis
3b Drive end
3c Bearing end
3d Output section
3e Movement thread
3e-1, 3e-2 Thread runout
4 Guide rod
4a Guide axis
4b, 4c Rod end
5, 6 Base plate
5a Retaining plate
5b, 5c, 6a Bearing
7 Inner spindle
7a Inner spindle axis
7b Movement thread
7b-1 Thread runout
7c, 7d Spindle end
7e Spindle section
7f Securing rod
7g Rod axis
7h, 7i Rod end
8 Securing tab
9 Shower screen
10 Plunger
11 Plunger holder
11a, 11b Plunger end
12 Brewing cylinder
12a Interior
12b Brewing chamber
13, 14 End face
15 Outer spindle nut
16, 17 Stop section
18, 19 Stop unit
18a, 19a Stop element
18b, 19b Compression spring
18c, 19c Disc
20 Drive motor
20a Motor axis
20b Motor output
21, 22 Gearing mechanism
23, 26 Input gear
24, 27 Output gear
27a Internal spindle nut
25, 28 Traction means
29, 29a; 30, 30a Hose
29b Connection
31, 32 Shell element
33 Screen element
34 Seal
34a Seal connection
35, 35a, 35b Connection
36 Valve
37 Driver
37a Retaining section
37b Guide section
37c Connection
37d Pocket axis
37e Pocket
38 Receptacle
38a Receptacle axis
BR, BR1, BR2 Direction of movement

What is claimed is:

1. A brewing unit (1) of a piston coffee machine, wherein the brewing unit (1) is designed as a spindle brewing unit having a brewing slide (2) as a brewing chamber, two piston units, one of the piston units being formed as a shower screen (9) and the other of the piston units being formed as a plunger (10), a drive motor (20) and at least one gearing mechanism (21, 22), wherein the brewing unit (1) further comprises a double-spindle assembly having an outer spindle (3) disposed radially outside the brewing chamber and an inner spindle (7) arranged coaxial with a slide axis of the slide, wherein during a brewing operation, the brewing slide (2) is configured to be moved from a first end position into an intermediate position, then into a second end position and back again into the first end position, wherein the outer spindle (3) has a movement thread (3e) which engages with an outer spindle nut (15) axially fixed in the brewing slide (2), and wherein the movement thread (3e) of the outer spindle (3) is disengaged from the outer spindle nut (15) in the first end position and in the second end position of the brewing slide (2) and a speed of the brewing slide (2) is zero even if the outer spindle (3) continues to rotate.

2. The brewing unit (1) according to claim 1, wherein the outer spindle (3) is connected to the brewing slide (2), the inner spindle (7) is connected to the shower screen (9) or the plunger (10), and the plunger (10) or the shower screen (9) is arranged in a fixed position, wherein the brewing slide (2) is guided in a longitudinally displaceable manner by means of the outer spindle (3) and a guide rod (4), and wherein the shower screen (9) or the plunger (10) is guided in a longitudinally displaceable manner inside the brewing slide (2), wherein the brewing slide (2) and the shower screen (9) or the plunger (10) are adjustable at different speeds in common directions of movement (BR1, BR2).

3. The brewing unit (1) according to claim 1, wherein said outer spindle (3) is driven by the drive motor (20) and is coupled to the inner spindle (7) via the at least one gearing mechanism (22).

4. The brewing unit (1) according to claim 1, wherein the brewing unit (1) has at least one switchable electromagnet which fixes the brewing slide (2) in one of the end positions in a releasable manner again directly or indirectly via a mechanical locking device.

5. The brewing unit (1) according to claim 1, wherein the brewing unit (1) comprises at least one spindle re-engagement device which causes re-engagement of the outer spindle nut (15) and the movement thread (3e) in the first end position or the second end position.

6. The brewing unit (1) according to claim 5, wherein the at least one spindle re-engagement device comprises first and second stop units (18, 19), each with a respective compression spring (18b, 19b), wherein the brewing slide (2) pretensions the compression spring (18b) of the first stop unit (18) in the first end position, and wherein the brewing slide (2) pretensions the compression spring (19b) of the second stop unit (19) in the second end position.

7. The brewing unit (1) according to claim 6, wherein the compression spring (18b) of the first stop unit (18) re-engages the movement thread (3e) of the outer spindle (3) with the outer spindle nut (15) of the brewing slide (2) when the brewing slide (2) is displaced from the first end position by means of the outer spindle (3), and wherein the compression spring (19b) of the second stop unit (19) re-engages the movement thread (3e) of the outer spindle (3) with the outer spindle nut (15) of the brewing slide (2) when the brewing slide (2) is moved from the second end position by means of the outer spindle (3).

8. The brewing unit (1) according to claim 5, wherein the at least one spindle re-engagement device comprises at least one switchable electromagnet which exerts a movement impulse on the brewing slide (2) in one of the end positions, directly or indirectly via a mechanical device, which movement impulse causes renewed engagement of the outer spindle nut (15) and movement thread (3e) in the first end position or the second end position.

9. The brewing unit (1) according to claim 5, wherein the at least one spindle re-engagement device comprises at least two switchable and reversible electromagnets, one of which is fixed and the other of which is attached to the brewing slide (2).

10. The brewing unit (1) according to claim 5 wherein the at least one spindle re-engagement device comprises at least one friction element directly on the inner spindle (7) or indirectly on a component mounted on the inner spindle (7) in cooperation with the brewing slide (2).

11. The brewing unit (1) according to claim 5, wherein the at least one spindle re-engagement device comprises at least one friction element configured as a hydraulic sealing element, wherein the at least one hydraulic sealing element is a seal (34) attached to the shower screen (9) or to the plunger (10), which seal (34) is controlled by the application of a pressure.

12. The brewing unit (1) according to claim 5, wherein the at least one spindle re-engagement device comprises a driver device having at least one driver (37), which is displaceably guided on the inner spindle (7) or a component connected to the inner spindle (7) and on a guide rod (4), wherein the driver (37) is held in a rest position with respect to the inner spindle (7) or the component connected to the inner spindle (7) with a certain retaining force which is greater in the rest position than outside the rest position.

13. The brewing unit (1) according to claim 12, wherein the at least one driver (37) comprises a first retaining element, and wherein a second retaining element is mounted on or in the inner spindle (7) or on or in the component connected to the inner spindle (7), wherein the first retaining element and the second retaining element generate the determined retaining force in the rest position of the driver (37).

14. The brewing unit (1) according to claim 13, wherein the first retaining element is a permanent magnet or is a springloaded ball pressure element which, in a rest position of the driver (37), is in contact with a corresponding indentation or groove in the inner spindle (7) or in the component connected to the inner spindle (7), and wherein the second retaining element is a permanent magnet.

15. The brewing unit (1) according to claim 1, wherein the inner spindle (7) comprises a movement thread (7b) which is in engagement with a fixedly rotatably mounted inner spindle nut (27a).

16. The brewing unit (1) according to claim 1, wherein the inner spindle nut (27a) is a component of an output gear (27) of the at least one gearing mechanism (22).

17. The brewing unit (1) according to claim 15, wherein the inner spindle (7) is connected to a securing rod (7f) as an anti-rotation device.

* * * * *